United States Patent
Isobe et al.

(10) Patent No.: US 7,340,153 B2
(45) Date of Patent: Mar. 4, 2008

(54) APPARATUS AND METHOD FOR RECORDING AND REPRODUCING INFORMATION

(75) Inventors: Yukio Isobe, Yokohama (JP); Susumu Yoshida, Kawasaki (JP); Tsutomu Imai, Yokohama (JP); Toshihiro Kato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1205 days.

(21) Appl. No.: 09/757,802

(22) Filed: Jul. 30, 2001

(65) Prior Publication Data

US 2002/0025138 A1  Feb. 28, 2002

(30) Foreign Application Priority Data

Jan. 11, 2000 (JP) ............................. 2000-006062

(51) Int. Cl.
*H04N 5/91* (2006.01)
*H04N 5/911* (2006.01)

(52) U.S. Cl. .................. 386/95; 386/100; 386/113
(58) Field of Classification Search ............. 386/46, 386/95, 113, 125, 126, 98, 100
See application file for complete search history.

(56) References Cited

U.S. PATENT DOCUMENTS

| | | | |
|---|---|---|---|
| 5,511,183 A | | 4/1996 | Ohmido et al. |
| 6,282,365 B1 | | 8/2001 | Gotoh et al. |
| 6,363,212 B1 | * | 3/2002 | Fujinami et al. ............ 386/112 |
| 6,633,724 B1 | * | 10/2003 | Hasegawa et al. .......... 386/113 |
| 6,795,381 B2 | | 9/2004 | Ando et al. |
| 6,978,084 B2 | | 12/2005 | Gotoh et al. |

FOREIGN PATENT DOCUMENTS

| | | |
|---|---|---|
| JP | 07-249270 A | 9/1995 |
| JP | 09-167447 A | 6/1997 |
| JP | A-11-187354 | 9/1998 |
| JP | 11-126436 A | 5/1999 |

OTHER PUBLICATIONS

JP 09-167447, dated [Jun. 24, 1997], Suzuki Yuichi, translation pp. 1-10 & one page claims and a cover sheet.*

* cited by examiner

*Primary Examiner*—Vincent F. Boccio
(74) *Attorney, Agent, or Firm*—Townsend and Townsend and Crew LLP

(57) ABSTRACT

When recording operation is stopped due to, for example, unexpected interruption of electric power supply in the course of the recording operation on a real time basis, a technique of repairing a moving picture and sound data recorded on a recording medium until the recording is stopped, to thereby restore management information data which enables random access and special reproduction is provided. A video/audio/management information multiplexing means is so implemented as to generate data required for generating management information data for allowing random access to the recording medium and effectuating special reproduction of the recording medium, for thereby multiplexing the data required for generating the management information data, encoded video data outputted from a video encoding means and encoded audio data outputted from an audio encoding means.

4 Claims, 20 Drawing Sheets

FIG.10

| CODE | STATUS | |
|---|---|---|
| 1 | MANAGEMENT INFORMATION EXPANSION STATUS | ~1000 |
| 2 | STREAM INFORMATION RECORDING STATUS | ~1010 |
| 3 | MANAGEMENT INFORMATION EXPANSION MEMORY UPDATE STATUS | ~1020 |
| 4 | RECORDING MEDIUM MANAGEMENT INFORMATION UPDATE STATUS | ~1030 |
| 1 | NORMAL END STATUS | ~1040 |

FIG.17

| CODE | MEANING | |
|---|---|---|
| 0 | NORMAL END STATUS | ~2500 |
| 1 | STREAM WRITE STATUS | ~2510 |
| 2 | IFO WRITE STATUS | ~2520 |
| 3 | BUP WRITE STATUS | ~2530 |

FIG.21

| STATUS | FLAG |
|---|---|
| MOVING PICTURE FILE BEING RECORDED | 1 |
| MANAGEMENT INFORMATION FILE BEING RECORDED AFTER RECORDING OF MOVING PICTURE FILE | 2 |
| STILL PICTURE FILE BEING RECORDED | 3 |
| MANAGEMENT INFORMATION BEING RECORDED AFTER RECORDING OF STILL PICTURE FILE | 4 |
| MOVING PICTURE FILE/STILL PICTURE FILE BEING EDITED | 5 |
| MANAGEMENT INFORMATION FILE BEING EDITED | 6 |
| MANAGEMENT INFORMATION BACKUP FILE BEING RECORDED | 7 |
| OTHER STATUS THAN THE ABOVE | 0 |

APPARATUS AND METHOD FOR RECORDING AND REPRODUCING INFORMATION

BACKGROUND OF THE INVENTION

The present invention relates to a technique for recording information on a recording medium or a technique for reproducing information from a recording medium.

As to the techniques concerning the recording medium and the recording apparatus for recording pictures and voices or sounds on a real time basis as well as reproducing apparatus and editors, description can be found, for example, in Japanese Patent Application Laid-Open Publication No. 187354/1999 (JP-A-11-187354).

More specifically, described in the publication mentioned above are a technique for recording on a recording medium video and/or audio data on a real time basis and recording management information data on the recording medium equally on a real time basis for making it possible to realize random access and special reproduction. However, when electric power supply to the apparatus is, for example, unexpectedly broken with the recording operation being thereby interrupted, the video and/or audio data and additionally the management information data will incorrectly be recorded on the recording medium without meeting predetermined format-related requirements.

By way of example, suppose that a battery has come off suddenly or unexpectedly in the course of taking picture or photographing with a camera in the field out of door and thereafter power supply is again turned on. In that case, processing for repairing or remedying the management information data is executed in order to enable the random access to the video/audio data and the special reproduction, which involves consumption of lots of time as well as power consumption of the battery, making thus it impossible to perform the video/audio recording as the user desires.

SUMMARY OF THE INVENTION

An object of the present invention is to provide a technique of repairing or remedying video and audio data having been recorded on a recording medium until stoppage of recording operation takes place due to, for example, unexpected breakage of electric power supply to thereby repair or restore the management information data which are used for enabling the random access and the special reproducing or playback operation.

Furthermore, it is an object of the present invention to provide an apparatus which is so arranged that when electric power supply is unexpectedly shut down in the course of recording operation performed on a real time basis and when the power supply is subsequently restarted, repair processing of the video/audio data and the management information data for enabling the random access and the special reproduction is omitted to thereby avoid wasteful time and power consumption while allowing the real-time based recording operation to be restarted immediately and thus ensuring significantly enhanced user-friendliness of the apparatus.

An information recording/reproducing apparatus which present invention concerns comprises a recording data multiplexing means for multiplexing at least encoded video data and encoded audio data, a record data storing means for storing data outputted from the above-mentioned recording data multiplexing means, a management-information-generation-destined data generating means for generating data required for generating management information for reproducing data recorded on the above-mentioned recording medium on the basis of data obtained from the above-mentioned recording data multiplexing means, a management information storing means for storing the above-mentioned management information, a management information generating means for generating the above-mentioned management information on the basis of the output of the above-mentioned management-information-generation-destined data generating means for writing or reading the above-mentioned management information in or from the management information storing means, a recording medium drive processing means for recording or reading on or from the recording medium at least information outputted from the above-mentioned recording data storing means or information outputted from the above-mentioned management information generating means, a recording status storing means for storing status information indicative of status of the recording processing, and a consolidative management means for managing the above-mentioned recording data multiplexing means, the recording data storing means, the above-mentioned management-information-generation-destined data generating means, the above-mentioned management information generating means, the above-mentioned management information storing means, the above-mentioned recording medium drive processing means and the above-mentioned recording status storing means, wherein the above-mentioned consolidative management means is arranged to write or read out the above-mentioned status information onto or from the above-mentioned recording status storing means.

Alternatively, an information recording/reproducing apparatus which the present invention concerns is an information recording/reproducing apparatus arranged for recording video and audio data on a recording medium which comprises a video encoding means for encoding an analog video signal, an audio encoding means for encoding an analog audio signal, a video/audio/management information multiplexing means (which may include the aforementioned recording data multiplexing means and the aforementioned management-information-generation-destined data generating means) for generating data required for generating management information data for making random access to the recording medium and effectuating special reproduction of the recording medium for thereby multiplexing the data required for generating the management information data, the encoded video data outputted from the video encoding means and encoded audio data outputted from the audio encoding means, a stream buffer (which may be constituted by the aforementioned recording data storing means) for storing multiplexed data outputted from the video/audio/management information multiplexing means by a predetermined amount for writing the above-mentioned multiplexed data onto the recording medium as a bit stream file, a volatile management information expansion memory (which may be constituted by the aforementioned management information storing means) for storing the above-mentioned management information data, a management information generating means for generating management information data from the data required for generation of the management information data to thereby write the management information data in the volatile management information expansion memory while writing the management information data onto the recording medium in the form of a management information file, a management information expanding means for reading out the management information file from the recording medium to thereby expand the management information file on the volatile management information expansion memory, a recording medium drive means (which may be constituted by the recording medium drive processing means) for directly reading or writing data from or onto the recording medium, a nonvolatile recording status memory (which may be constituted by the recording status storing means) which is a nonvolatile memory for storing process of recording processing, and a consolidative management means for managing consolidatively the above-mentioned video encoding means, the above-mentioned audio encoding means, the above-mentioned video/audio/management information multiplexing means, the above-mentioned stream buffer, the above-mentioned management information generating means, the above-mentioned management information expanding means, the above-mentioned volatile management information expansion memory and the above-mentioned recording medium drive means, to thereby write or read the status of processings thereof in or from the nonvolatile recording status memory. With the structure described above, it is contemplated that when the electric power supply is unexpectedly broken in the course of real-time-based recording, the status of recording in which the electric power supply was broken in the course of recording on the real time basis is stored in the nonvolatile memory.

Parenthetically, it should be added that the aforementioned video/audio/management information multiplexing means may be so designed that the data required for generating the management information data are not necessarily be multiplexed with the encoded video data and the encoded audio data. However, the aforementioned video/audio/management information multiplexing means should be so designed as to generate at least the data required for generation of the management information data which is to be outputted or supplied to the management information generating means.

Further, the data which are used upon generation of the data required for generating the management information data are not restricted to the encoded video data and the encoded audio data but may be such data which can be used for generating the management information data required for enabling the random access to the recorded bit stream file and the reproduce processing such as the special reproduction.

Further, an information recording/reproducing apparatus which the present invention concerns is so arranged that in the aforementioned information recording/reproducing apparatuses, it comprises a recording medium drive processing means for recording or reading out information on or from a recording medium, a record data demultiplexing means for demultiplexing the encoded video data and the encoded audio data from the information read out from the recording medium, a management-information-generation-destined data generating means for generating data required for generating management information for reproducing data recorded on the aforementioned recording medium on the basis of the data obtained from the above-mentioned record data demultiplexing means, the aforementioned management information storing means for storing the aforementioned management information, the aforementioned management information generating means for generating the management information on the basis of output of the above-mentioned management-information-generation-destined data generating means for writing or reading out the management information in or from the above-mentioned management information storing means, a management information reading means for reading out the management information from information read out from the aforementioned recording medium for outputting the management information to the above-mentioned management information storing means, and a consolidative management means for managing the above-mentioned record data demultiplexing means, the above-mentioned management-information-generation-destined data generating means, the above-mentioned management information generating means, the above-mentioned management information storing means, the above-mentioned recording medium drive processing means, the above-mentioned management information reading means and the above-mentioned recording status storing means, wherein the aforementioned recording medium drive processing means is designed to record the information outputted from the above-mentioned management information generating means on the above-mentioned recording medium, and wherein the above-mentioned consolidative management means is designed to write or read out the aforementioned status information onto or from the above-mentioned recording status storing means.

Alternatively, an information recording/reproducing apparatus which the present invention concerns comprises a video/audio/management information demultiplexing means (which may include the aforementioned recording data demultiplexing means and the aforementioned management-information-generation-destined data generating means) for reading out the aforementioned bit stream file recorded on a recording medium to thereby demultiplex encoded video data, encoded audio data and data required for generating management information data, a volatile management information expansion memory for storing the management information data, a management information generating means for generating management information data from data required for generation of the management information data to thereby write the management information data in the volatile management information expansion memory while writing the management information data onto the recording medium in the form of a management information file, a management information expanding means (which may be constituted by the aforementioned management information reading means) for reading out the management information file from the recording medium to thereby expand the management information file on the volatile management information expansion memory, a recording medium drive means for directly reading or writing data from or onto the recording medium, a nonvolatile recording status memory which is a nonvolatile memory for storing process of recording processing, and a consolidative management means for managing consolidatively the above-mentioned video/audio/management information demultiplexing means, the above-mentioned management information generating means, the above-mentioned management information expanding means, the above-mentioned volatile management information expansion memory and the above-mentioned recording medium drive means, to thereby write or read the status of processings thereof in or from data of the nonvolatile recording status memory. With this arrangement, it is contemplated that when the power supply is unexpectedly broken in the course of recording on a real time basis and when the power supply is subsequently restarted, the status of the real time recording in which the power supply was broken is acquired from the nonvolatile memory for remedying correspondingly the data written on the recording medium.

At this juncture, it should be added that although it has been described that the above-mentioned video/audio/management information demultiplexing means is designed to read out the aforementioned bit stream file recorded on the recording medium for demultiplexing or separating the data required for generating the management information data, it is not always necessary to perform the processing for demultiplexing or separating the data required for generating the management information. However, it is preferred that the video/audio/management information demultiplexing means be so designed as to generate at least the data required for generating the management information data which is to be supplied to the management information generation processing.

Furthermore, the data used by the above-mentioned video/audio/management information demultiplexing means for generating the data required for the generation of the management information data are not restricted to the encoded video data and the encoded audio data but may be the data capable of being used for generating the management information data which are required for making random access to the bit stream file recorded in the aforementioned recording medium and for the reproduce processing such as the special reproduction and the like. Incidentally, in the information recording/reproducing apparatus described above, the aforementioned recording status storing means may be constituted by a storing means which is capable of holding the stored information notwithstanding of breakage of the electric power supply.

Besides, in the information recording/reproducing apparatus described above, it is preferred that the information recorded on the recording medium be so processed that it can be reproduced on the basis of the status information read out from the recording status storing means mentioned previously.

Further, in the information recording/reproducing apparatus described above, it is preferred that the information read out from the recording medium be checked on the basis of the aforementioned status information read out from the aforementioned recording status storing means to thereby delete data extending from a record unit or segment containing the unreproducible information up to an end of a file.

Moreover, in the information recording/reproducing apparatus described above, it is preferred that a group of management units or segments composed of information read out from the aforementioned recording medium be checked on the basis of the aforementioned status information read out from the aforementioned recording status storing means to thereby delete the management unit or segment including the record unit or segment containing the unreproducible information, and that those management units or segments which include a starting one of the management unit or segment group up to the record unit or segment containing the aforementioned unreproducible information be defined as a first management unit or segment group while the management units or segments including the record unit or segment containing the aforementioned unreproducible information up to the end of the above-mentioned management unit or segment group be defined as a second management unit group.

Parenthetically, when the present invention is applied to the case where the stream conforming to the DVD Video Recording Standards (hereinafter simply referred to as the VR standards), the aforementioned record unit or segment may be equivalent to the pack specified in the VR standards, while the management unit or segment may correspond to VOBU (VOB Unit) with the management unit (segment) group corresponding to VOB (Video Object).

Further, an apparatus which the present invention concerns is arranged such that in the information recording/reproducing apparatus described above, the information outputted from the aforementioned recording data storing means is recorded in the form of a data file on the aforementioned recording medium with the information outputted from the aforementioned management information generating means being recorded as first and second plural sets of management information files, and that the apparatus comprises a file system manage processing means for managing the files so that the file can be written or read on or from the aforementioned recording medium in a predetermined file format or a new file can be generated from two files, a first management information file read processing means for reading out the first set of management information file from the above-mentioned file system manage processing means, a first management information storing means for storing the above-mentioned first set of management information read out from the above-mentioned first management information file read processing means as first management information, a management information file write processing means for reading out the above-mentioned first management information from the above-mentioned first management information storing means to thereby write the above-mentioned first management information in the file system manage processing means as the above-mentioned first set of management information file, a second management information file read processing means for reading out the above-mentioned second set of management information file from the above-mentioned file system manage processing means, a second management information storing means for storing the above-mentioned second set of management information read out from the above-mentioned second management information file read processing means as second management information, a combine processing means for generating new management information from the information stored in the above-mentioned first management information storing means and the information stored in the above-mentioned second management information storing means to thereby write the new management information in the above-mentioned first management information storing means, wherein the above-mentioned data file and the above-mentioned plural sets of management information files are combined in one set.

Furthermore, an information recording/reproducing apparatus which the present invention concerns may be so arranged that in the information recording/reproducing apparatus described above, a first set of the data file and the aforementioned management information file recorded on the aforementioned recording medium are checked on the basis of the aforementioned status information read out from the aforementioned recording status storing means to thereby alter an identifier of the above-mentioned first set to a second identifier in the case where the unreproducible information is included in the first set, wherein a new data file and a new management information file to be recorded on the above-mentioned recording medium is recorded on the above-mentioned recording medium as a first set of the new data file and the new management information file.

In this conjunction, let's consider, for example, a case where the present invention is applied to handling of the stream which conforms to the VR standards. When a file resident in a DVD_RTAV directory is in the state insusceptible of being normally reproduced due to interruption of recording because of the occurrence of unexpected breakage of the power supply in the course of the recording, there may arise such situation that the recording can not be started unless the file is repaired or remedied to the state susceptible of normal reproduction.

Thus, by applying the teachings of the present invention described above, the name of the DVD_RTAV directory containing the file of the state insusceptible of normal reproduction (identifier of the first set) is altered to e.g. a DVD_RTAV_BAK directory (identifier of the second set). As a result of this, when the recording is restarted, information to be renewedly recorded can newly be recorded internally of the new DVD_RTAV directory as the file based on the VR standards. This means that the recording can be started without repairing the file of the state insusceptible of normal reproduction.

Incidentally, the present invention can equally be applied to the case where two or more sets of the aforementioned data files and the aforementioned management information files recorded on the aforementioned recording medium are to be recorded on the aforementioned recording medium in a set.

Alternatively, an apparatus which the present invention concerns comprises a recording medium having an area for recording plural sets of management information files for managing an encoded picture data file and a picture data file, a recording medium drive processing means for writing or reading out information onto or from the recording medium, a file system manage processing means for writing or reading out a file onto or from the recording medium in a predetermined file format and/or combining two files, a management information file read processing means for commanding reading of the management information file from the file system manage processing means, a management information expansion memory for storing therein the management information file read out from the management information file read processing means as management information expansion data, a management information file write processing means for reading out the management information expansion data from the management information expansion memory to command writing of the management information expansion data in the file system manage processing means as the management information file, a backup management information file read processing means for commanding reading of a backup management information file from the file system manage processing means, the backup management information file being a file of a same format as the management information file but differing therefrom, a backup management information expansion memory for storing therein the backup management information file read out from the backup management information file read processing means as backup management information expansion data, and a combine processing means for combining integrally the information of the management information expansion memory and the information of the backup management information expansion memory to write the combined information in the management information expansion memory, wherein plural sets of the picture data files and the management information files are combined together into one set.

Further, an apparatus which the present invention concerns is characterized in that the apparatus comprises a moving picture compression-encode processing means for performing compression-encoding of analog moving pictures, a sound compression-encode processing means for performing compression-encoding of analog sound, a moving picture/sound multiplex processing means for multiplexing compression-encoded moving picture data outputted from the moving picture compression-encode processing means and compression-encoded sound data outputted from the sound compression-encode processing means, a management-information-expansion data generate processing means for acquiring information required for management information file generation from the moving picture/sound compression-multiplex processing means to write additionally the information in management information expansion data expanded on the management information expansion memory as management information expansion data, a stream buffer for storing once temporarily a multiplexed stream outputted from the moving picture/sound compression-multiplex processing means, a stream buffer managing means for commanding writing of the multiplexed data into the file system managing means from the stream buffer as a multiplexed stream file, a nonvolatile status management memory which is a nonvolatile memory for storing process stage statuses of recording processing, and a repair processing means for repairing format of the management information file or the multiplexed stream file to restore a normal format thereof when the management information file or the multiplexed stream file is abnormal, wherein upon activation, the nonvolatile status management memory is monitored or supervised, a command is issued for expanding the management information file on the management information expansion memory in dependence on the statuses, command is issued to the repair processing means for repairing the management information file and the multiplexed stream file and altering names of the management information file and the multiplexed stream file, whereon plural sets of the picture data files and the management information files are combined into one set so that when unexpected breakage of power supply takes place in the course of real-time picture recording operation with a recording apparatus such as a camera in the outdoor field with the recording operation being thus stopped once and when the power supply is started again, it is possible to determine selectively whether the processing for repairing the video data and the audio data recorded on the recording medium as well as the management information data therefor in respect to predetermined format(s) is to be executed or not.

Additionally, for achieving the objects described previously, the present invention teaches that a status storing memory arranged for storing finely classified status discriminating flags is provided, wherein upon repairing operation, the stream data are sequentially analyzed, stating from a concerned data location determined in dependence on the status discriminating flags, for thereby repairing the management information file and the audio/video bit stream file (hereinafter also referred to as the AV data files) themselves. Further, when a defective portion is found at an intermediate position, the AV data files are repaired by cutting away an appropriate encode unit which contains the relevant portion. Alternatively, even when the defective portion is found at an intermediate location of the stream data, arrangement may be made such that the relevant portion is not cut away but the management information is modified to the form suffering no inappropriateness, to thereby repair the management information file and the AV data file so that they provide no obstacles to the succeeding recording/reproduction.

Furthermore, the present invention provides an information recording/reproducing method which comprises a recording data multiplexing step of multiplexing at least encoded video data and encoded audio data, a record data storing step of storing data outputted from the above-mentioned recording data multiplexing step, a management-information-generation-destined data generating step of generating data required for generating management information for reproducing data recorded on the recording medium, a management information generating step of generating the above-mentioned management information on the basis of output from the above-mentioned management-information-generation-destined data generating step, a management information storing step of storing the management information, a step of reading out the management information stored in the above-mentioned management information storing step, a recording medium drive processing step of recording or reading on or from a recording medium at least the information stored in the recording data storing step or the information stored in the management information storing step, a recording status storing step of storing status information indicative of statuses of recording processing, and a step of reading out the status information stored in the recording status storing step.

Moreover, an information recording/reproducing method which the present invention concerns resides in that in the information recording/reproducing method described above, the former comprises the aforementioned recording medium drive processing step of recording information on the aforementioned recording medium or reading the information from the above-mentioned recording medium, a record data demultiplexing step of demultiplexing or separating the encoded video data and the encoded audio data from the information read out from the recording medium, the aforementioned management-information-generation-destined data generating step of generating data required for generation of management information for reproducing data recorded on the recording medium on the basis of the data obtained from the above-mentioned record data demultiplexing step, the aforementioned management information generation step of generating the management information on the basis of the output from the above-mentioned management-information-generation-destined data generating step, the aforementioned management information storing step of storing the above-mentioned management information, a step of outputting the above-mentioned management information to the above-mentioned management information storing step from the above-mentioned management information generation step or reading out the above-mentioned management information stored in the above-mentioned management information storing step, a management information reading step of reading out the above-mentioned management information from the information read from the aforementioned recording medium to thereby output the management information to the above-mentioned management information storing step, a step of recording the information outputted from the above-mentioned management information generation step on the above-mentioned recording medium, a recording status storing step of storing status information indicative of statuses of recording processing, and a step of reading out the status information stored in the above-mentioned recording status storing step.

BRIEF DESCRIPTION OF THE DRAWINGS

FIG. 10 is a structural diagram showing a data array in a nonvolatile recording status memory.

FIG. 17 is a diagram showing a data structure in a nonvolatile status management memory.

FIG. 21 is a view showing typical status flags stored in a status storing memory.

DETAILED DESCRIPTION OF THE INVENTION

In the following, a first embodiment of the present invention will be described in detail by reference to the drawings. Incidentally, in the description which follows, the information recording/reproducing apparatus according to the present invention will be elucidated not only as the information recording/reproducing apparatus literally but also as a recording apparatus or a recorded information repairing apparatus.

Figure 1:
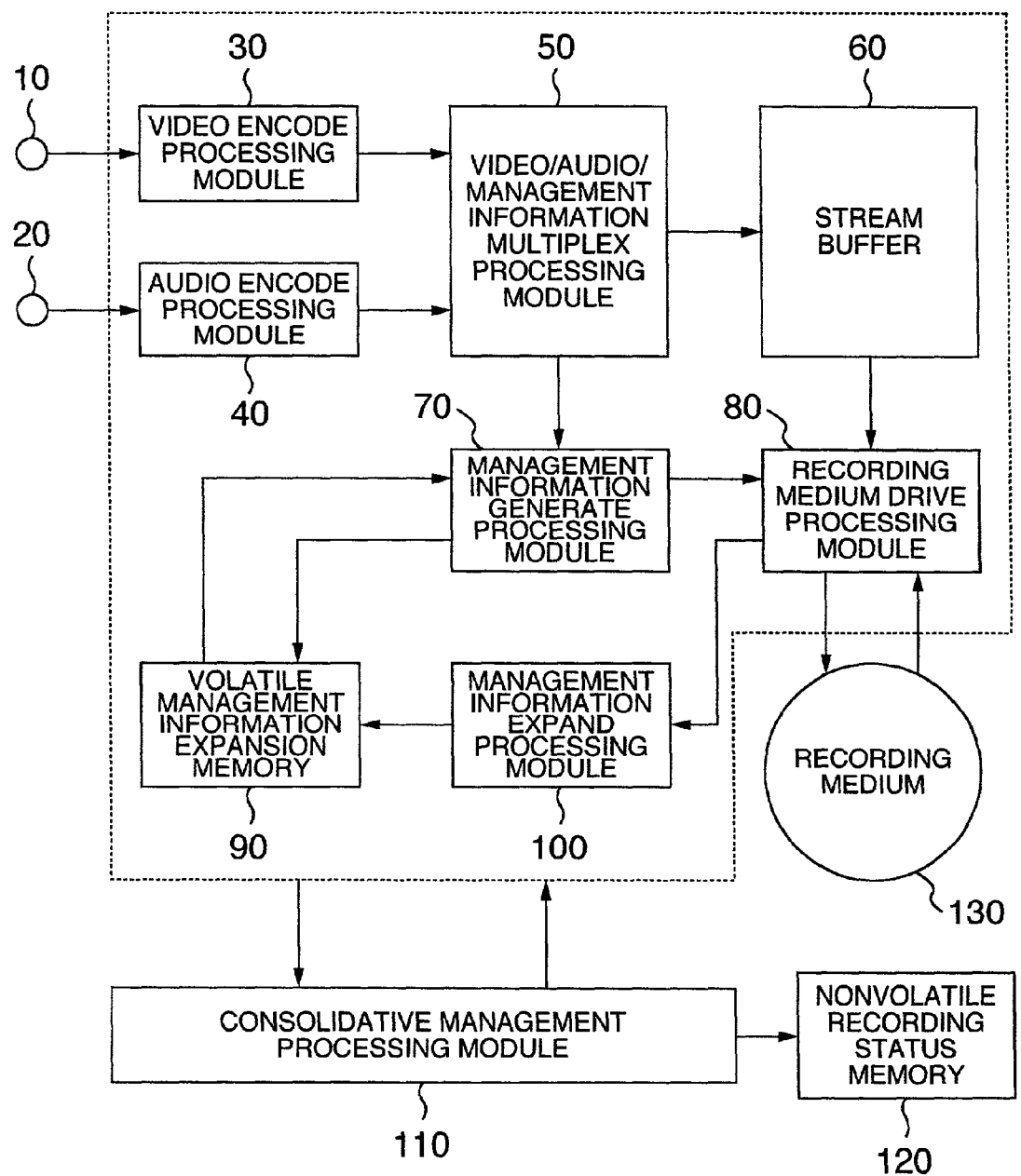
FIG. 1 is a block diagram showing a management information recording system.

FIG. 1 is a block diagram of a recording apparatus according to a first embodiment of the present invention.

The recording apparatus according to the first embodiment of the invention shown in FIG. 1 is comprised of an input terminal 10 for analog video data, an input terminal 20 for analog audio data, a video encode processing module 30, an audio encode processing module 40, a video/audio/management information multiplex processing module 50, a stream buffer 60, a management information generate processing module 70, a recording medium drive processing module 80, a volatile management information expansion memory 90, a management information expand processing module 100, a consolidative management processing module 110, a nonvolatile recording status memory 120 and a recording medium 130.

Figure 2:
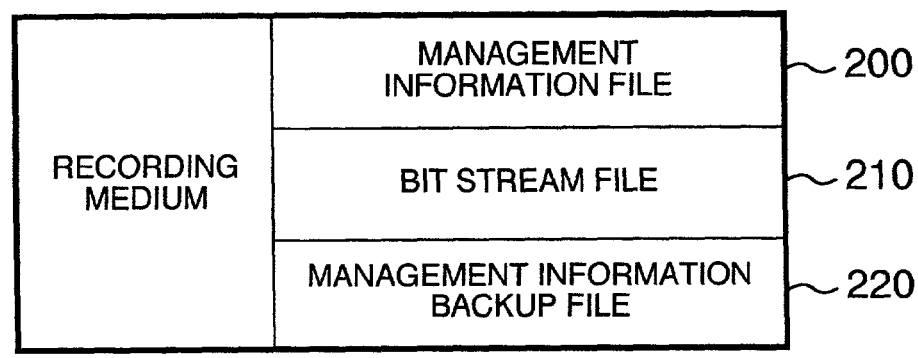
FIG. 2 is a structural diagram showing an arrangement of files recorded on a recording medium.

As a compression processing scheme for video and audio data, there can be mentioned, for example, the MPEG (Motion Picture Experts Group) scheme. Although the MPEG scheme is adapted to cope with the random access and the special reproduction, it is not in the position to realize easily these operations. Such being the circumstances, in the case where the video and audio data are compressed and recorded on a recording medium, it is necessary for realizing the random access and the special reproduction to generate not only the information of compressed bit streams but also management information data for the random access and the special reproduction for recording on the recording medium. FIG. 2 shows, by way of example, a file structure recorded on a recording medium in the case where video and audio data are compressed and to be recorded on a recording medium in accordance with the MPEG scheme.

It is supposed, for example, that video and audio data are recorded with the aid of a video camera. In that case, when a recording start button of the recording apparatus is pushed by a user, recording on a recording medium is started, while when a recording end button of the recording apparatus is pressed by the user, the recording on the recording medium is terminated. In this conjunction, the period intervening between the start of recording and the end thereof will be termed the record unit. By conducting repetitively the recording start operation and the recording end operation, the bit streams conforming to the MPEG standards (hereinafter simply referred to as the bit stream) are additively and sequentially written or recorded on the recording medium. In that case, the video and audio multiplexing scheme conforms to the program stream scheme of the MPEG system, and the recording on the recording medium is performed in accordance with this scheme.

As can be seen in FIG. 2, the files implemented or substantiated on the recording medium include a management information file 200, a bit stream file 210 and a management information backup file 220. The management information file 200 records therein the management information concerning the bit streams on a per record unit basis. In the bit stream file 210, bit stream data are recorded on a per record unit basis continuously in one file. The management information backup file 220 records therein utterly same information as those of the management information file 200 and is put into service when the management information file 200 can not be read.

In the following description, the terms used in the MPEG standards such as GOP, PTS, pack, pack header, system header, packet header, I-picture, P-picture, B-picture, frame field, elementary stream, etc. will be used without any special definition or elucidation.

Figure 3:
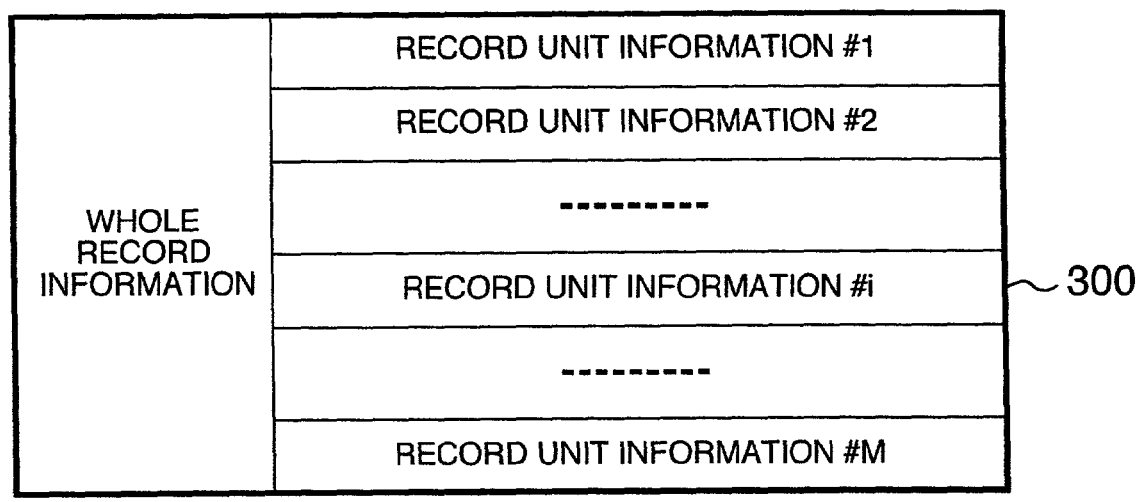
FIG. 3 is a structural diagram showing a data structure in a management information file recorded on the recording medium.

Description will be made of a management information file. The management information file 200 is generated in the form in which the random access and the special reproduction are taken into account. An exemplary data structure of the management information file is shown in FIG. 3. In the management information file 200, information concerning the bit stream is recorded on a per record unit basis. As is shown in FIG. 3, the management information file 200 is composed of record unit information #1, record unit information #2, . . . , record unit information #i, . . . and record unit information #M.

In the case of the data structure shown in FIG. 3, the information containing the record unit information #1, the record unit information #2, . . . , the record unit information #i, . . . and the record unit information #M is designated as whole record information 300.

Figure 4:
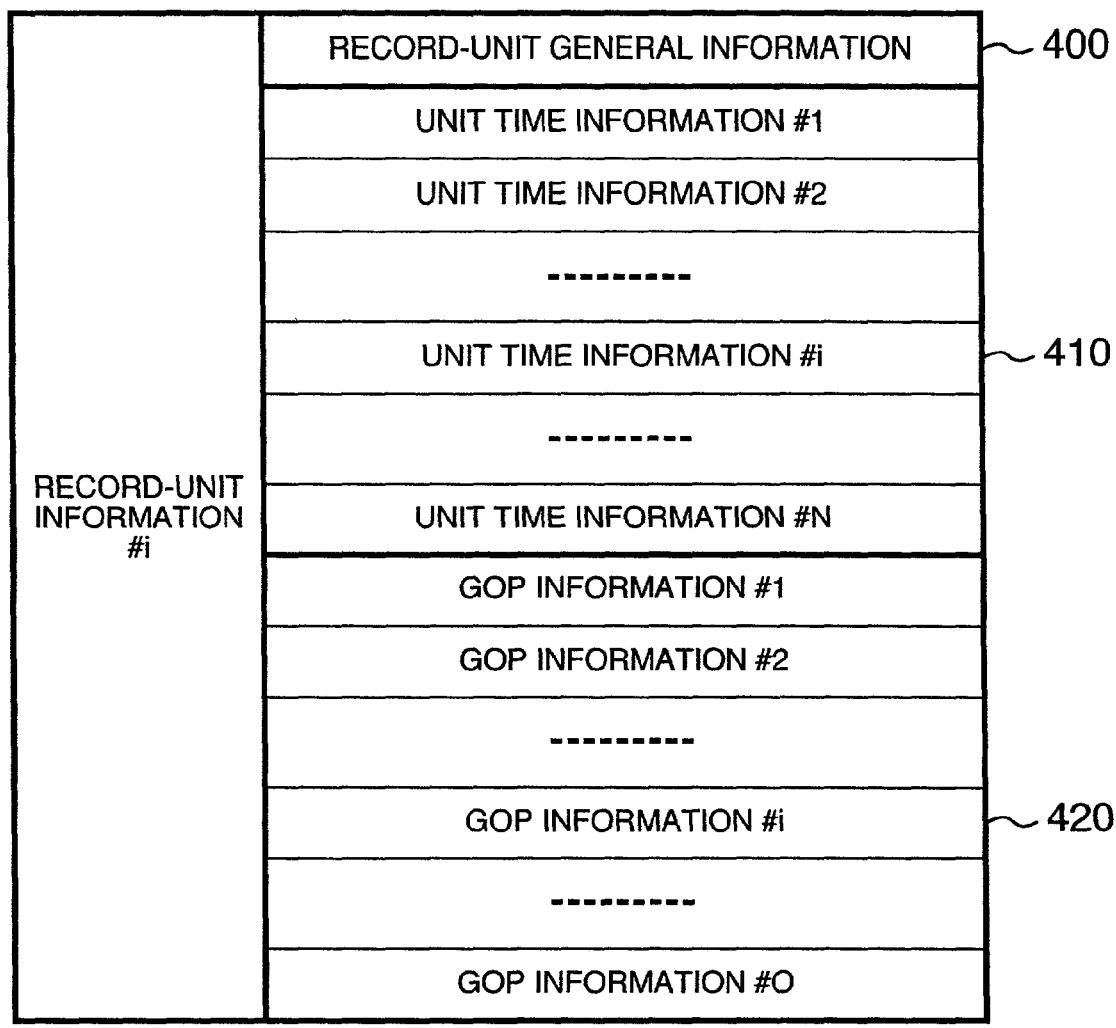
FIG. 4 is a structural diagram showing a data structure of record unit information in the management information file.

In the whole record information 300, the record unit information #i is classified in further detail, an exemplary structure of which is shown in FIG. 4. As can be seen in FIG. 4, the record unit information #I is composed of record-unit general information 400, unit time information #1, unit time information #2, . . . , unit time information #i, . . . and unit time information #N, and GOP information #1, GOP information #2, . . . , GOP information #i, . . . and GOP information #O.

At this juncture, the information containing the time information #1, the time information #2, . . . , the time information #i, . . . and the time information #N is designated as the time information 410. Similarly, in FIG. 4, the information containing the GOP information #1, the GOP information #2, . . . , the GOP information #i, . . . and the GOP information #O is designated as the GOP information 420.

Figure 5:
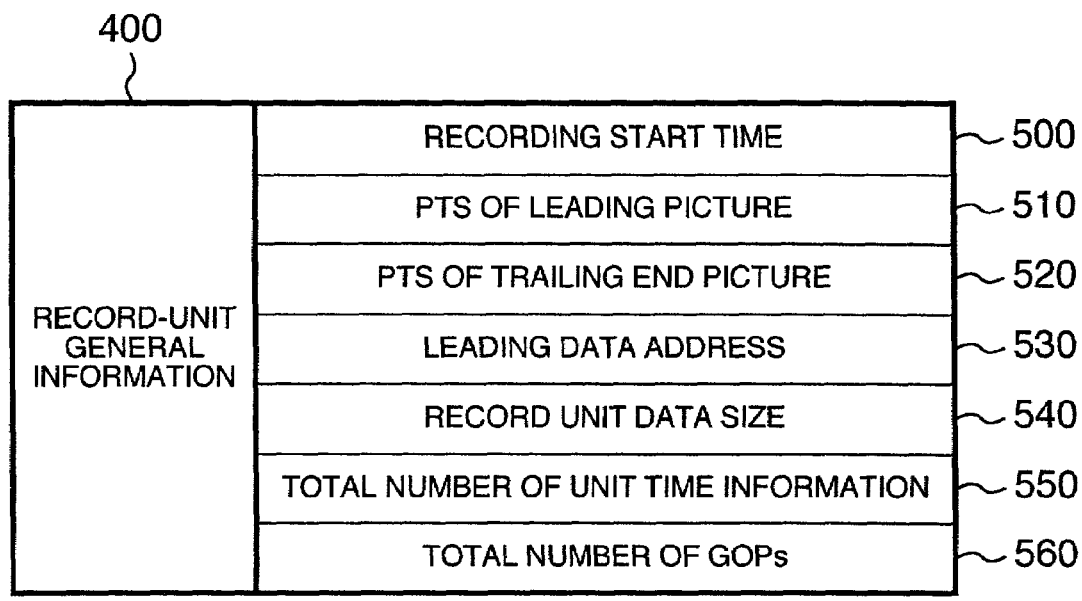
FIG. 5 is a structural diagram showing a data structure of record-unit general information in the management information file.

The record-unit general information 400 can be classified in further detail, an exemplary structure of which is shown in FIG. 5.

As shown in FIG. 5, the record-unit general information 400 is composed of a recording start time 500, a PTS 510 of a leading picture, a PTS 520 of a trailing end picture, a leading data address 530, a record unit data size 540, a per unit time information total number (i.e., total number of per unit time information) 550 and a GOP total number (total number of GOPs) 560. The recording start time 500 represents a time point at which recording of a given record unit was started. The PTS 510 of the leading picture represents the PTS of the leading frame in display of a record unit. The PTS 520 of the trailing end picture is represented by a value resulting from addition of a one-frame display period to the PTS of the final frame in the display of the record unit. The leading data address 530 represents the address allocated to the bit stream file 210 for the leading data of the bit stream of the record unit #i. One address corresponds to one pack constituted by 2048 bytes. To say in another way, one address corresponds to a data length of 2048 bytes. The record unit data size 540 represents a data size of the record unit #i. Similarly to the address, one data size corresponds to one pack composed of 2048 bytes. The per unit time information total number (i.e., the total number of the per unit time information) 550 represents the number of unit time information contained in the record unit #i. The GOP total number 560 represents the number of the GOPs contained in the record unit #i.

Figure 6:
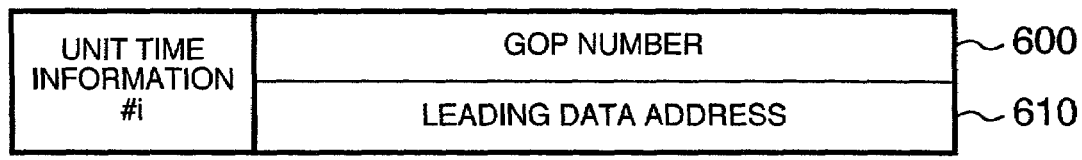
FIG. 6 is a structural diagram showing a data structure of unit time information in the management information file.

The unit time information #i can be classified in further detail, an exemplary structure of which is shown in FIG. 6. As can be seen in FIG. 6, the unit time information #i is composed of a GOP number 600 and leading address data 610. Parenthetically, the unit time is of a fixed time length and used in making random access to an intermediate portion of a given record unit for the purpose of decreasing the operation overhead involved in the arithmetic determination of the address allocated to the relevant bit stream file.

By way of example, the value of 10 seconds will be appropriate for the unit time. The GOP number 600 indicates the number of GOPs as counted from the start of the record unit #i of the leading GOP of the record unit information #i. The leading address data 610 represents a relative address from the leading data of the record unit #i on the bit stream file.

Figure 7:
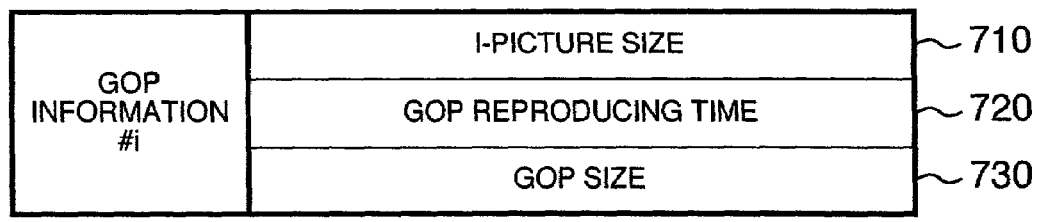
FIG. 7 is a structural diagram showing a data structure of GOP information in the management information file.
Figure 8:
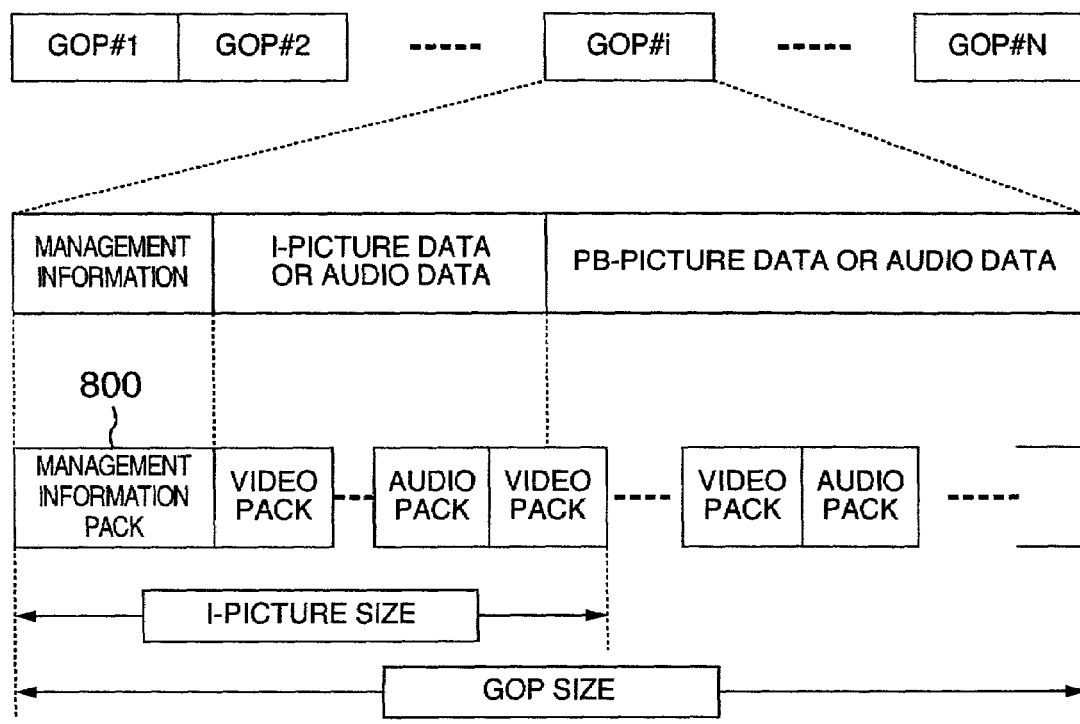
FIG. 8 is a structural diagram showing a data structure of a record unit in a bit stream file.

The GOP information #i can be classified in further detail, an exemplary structure of which is shown in FIG. 7. As can be seen in FIG. 7, the GOP information #i is composed of an I-picture size 710, a GOP reproducing time 720 and a GOP size 730. The I-picture size 710 represents a size extending from the leading end of the GOP to a pack which contains the final data of the I picture, as is shown in FIG. 8. Similarly to the address, one data size corresponds to one pack constituted by 2048 bytes. The GOP reproducing time 720 is represented by a value which indicates the reproducing time of the GOP in terms of a field unit. The GOP size 730 represents the data size of the GOP, as can be seen in FIG. 8. Similarly to the address, one data size corresponds to one pack which is composed of 2048 bytes.

The bit stream file 210 will now be described. In the bit stream file 210, the bit stream data are continuously recorded in one file on a per record unit basis. An exemplary structure of a given record unit in the bit stream file 210 is illustrated in FIG. 8. As can be seen in FIG. 8, a given one of the record units is composed of several GOPs. In the GOP, a management information pack 800 is disposed in the leading one pack and the information required for generating the management information file 200 is recorded therein. In the immediately succeeding pack, the I-picture or audio data is recorded. In further succeeding packs, there are recorded the P-pictures, the B-pictures and/or the audio data.

Figure 9:
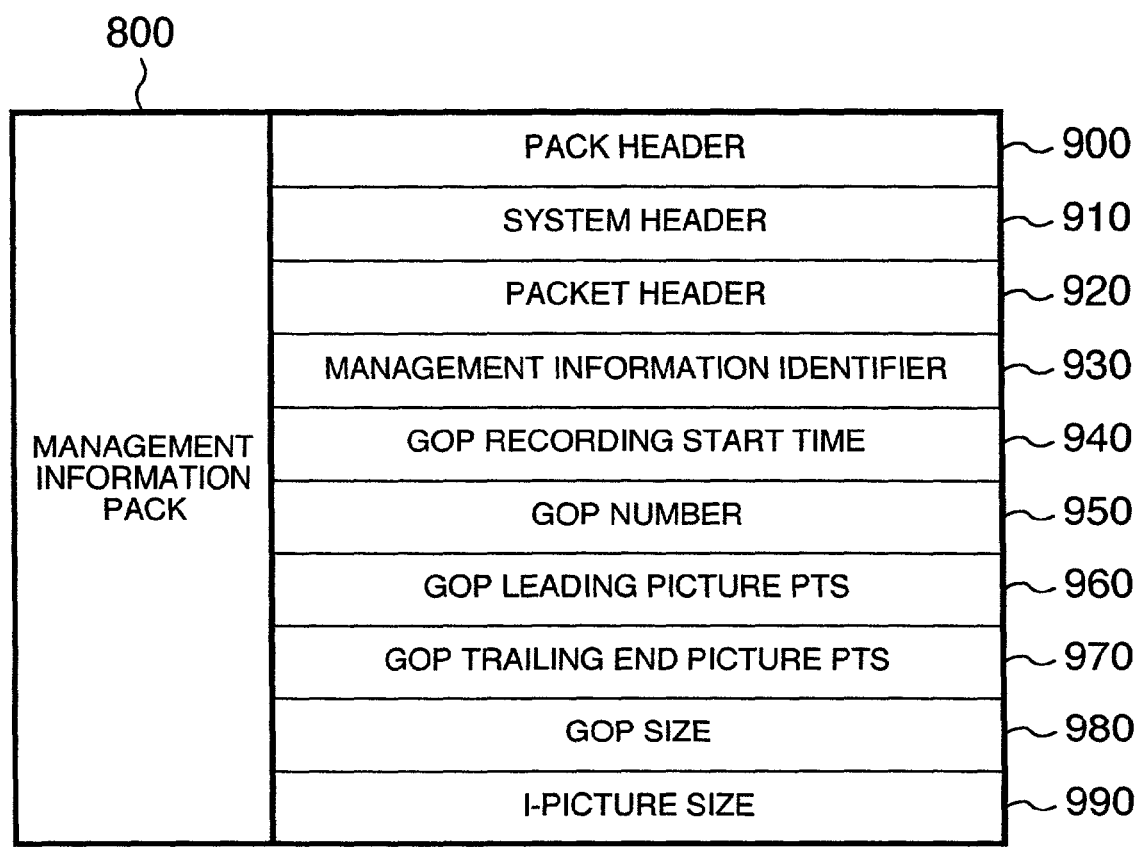
FIG. 9 is a structural diagram showing a data structure of management information pack in a bit stream file.

An exemplary structure of the management information pack 800 is illustrated in FIG. 9. The management information pack 800 is composed of a pack header 900, a system header 910, a packet header 920, a management information identifier 930, a GOP recording start time 940, a GOP number 950, a GOP leading picture PTS 960, a GOP trailing end picture PTS 970, a GOP size 980 and an I-picture size 990. The pack header 900, the system header 910 and the packet header 920 are based on the MPEG program stream, wherein in the packet header 920, neither video pack nor the audio pack is recorded but recorded is the information that indicates a private pack which permits user definition.

The record unit management information identifier 930 is a unique identifier indicating discriminatively or definitely the record which has been generated by the recording apparatus according to the present invention. This identifier may be, for example, 32 bits in length. In practical applications, "18273645H" or the like will be appropriate for this identifier.

The GOP recording start time 940 represents a time point at which recording of the GOP is started. The GOP number 950 is a value that indicates the position at which the GOP preceding by one to the GOP recording the management information pack 800 occupies in the sequential order of the GOPs, as counted from the start of the record unit. The GOP leading picture PTS 960 indicates the PTS of the leading display frame of the GOP preceding by one to the GOP recording the management information pack 800. The GOP trailing end picture PTS 970 indicates a PTS which is determined by addition of one-frame period to the PTS of the trailing display frame of the GOP preceding by one to the GOP recording the management information pack 800. The GOP size 980 indicates the data size of the GOP which precedes by one to the GOP recording the management information pack 800. The I-picture size 990 indicates the I-picture size of the GOP which precedes by one to the GOP which records therein the management information pack. In this manner, there is recorded the information concerning the GOP which precedes by one to the GOP recording therein the management information pack 800. Recorded in the GOP recording start time 940 and the GOP number 950 of the leading management information pack 800 of the leading GOP of a given record unit record are valid data, wherein the value of the GOP number is "0". The values of the GOP leading picture PTS 960, the GOP trailing end picture PTS 970, the GOP size 980 and the I-picture size 990 are not particularly specified and handled as invalid data.

The recording apparatus shown in FIG. 1 is an apparatus designed for recording on a recording medium the management information file 200, the stream data file 210 and the management information backup file 220 described above.

In the following, the recording apparatus shown in FIG. 1 will be described in detail.

Analog video data is inputted through the input terminal 10 for the analog video data to be subsequently transferred to the video encode processing module 30 which is designed to encode the analog video data in conformance with a predetermined encoding scheme. In the case of the instant embodiment of the invention, it is presumed, by way of example, that the MPEG scheme or system is adopted. The video data undergone compression encoding in conformance with the MPEG standards is transferred to the video/audio/management information multiplex processing module 50 as a video elementary stream. On the other hand, analog audio data is inputted through the analog audio data input terminal 20 to be subsequently transferred to the audio encode processing module 40.

The audio encode processing module 40 is designed to encode the analog audio data in accordance with a predetermined encoding scheme. In this conjunction, it is presumed, by way of example, that in the case of the instant embodiment of the invention, brig the MPEG scheme or standards is adopted, similarly to the case of the video data. Thus, the audio data undergone compression encoding in conformance with the MPEG standards is transferred to the video/audio/management information multiplex processing module 50 as an audio elementary stream. The video elementary stream and the audio elementary stream inputted to the video/audio/management information multiplex processing module 50 are used for generating a video packetized elementary stream (video PES) and an audio packetized elementary stream (audio PES) each packetized with 2048 bytes for the purpose of generating an MPEG program stream.

Further, the management information pack 800 of the data structure shown in FIG. 9 is also generated. The video PES, the audio PES and the management information pack 800 are disposed in the stream buffer 60 in accordance with the pack array shown in FIG. 8. Furthermore, in the data structure shown in FIG. 9, the GOP recording start time 940, the GOP number 950, the GOP leading picture PTS 960, the GOP trailing end picture PTS 970, the GOP size 980 and the I-picture size 990 are transferred to the management information generate processing module 70 every time the GOP is generated.

The bit streams stored accumulatively in the stream buffer 60 are written onto the recording medium 130 through the medium of the recording medium drive processing module 80 every time the stored bit stream has reached a predetermined amount. This bit stream is written on the recording medium 130 in the form of the bit stream file 210 shown in FIG. 2.

The management information expand processing module 100 is designed to read out the management information file 200 written on the recording medium 130, as shown in FIG. 2, through the medium of the recording medium drive processing module 80, whereby the management information file is developed or expanded on the volatile management information expansion memory 90. The volatile management information expansion memory 90 is a memory whose contents as stored are initialized upon interruption of electric power supply to the memory. Parenthetically, the management information data may equally be processed straightforwardly from the recording medium 130. However, higher access speed can be ensured by resorting to the processing with the aid of the volatile management information expansion memory 90.

When the recording apparatus according to the instant embodiment of the invention is powered on, then the management information file 200 on the recording medium 130 is firstly expanded on the volatile management information expansion memory 90. The management information generate processing module 70 is designed to update from the start of recording up to the end thereof the management information shown in FIGS. 3, 4, 5, 6 and 7 on the basis of the data transferred from the video/audio/management information multiplex processing module 50 and the data expanded on the volatile management information expansion memory 90, to thereby rewrite the information on the volatile management information expansion memory 90. At the end of the recording, the data of the volatile management information expansion memory 90 are overwritten on the recording medium 130 in the form of the management information file 200 through the medium of the recording medium drive processing module 80. Moreover, a copy of the management information file is overwritten on the management information backup file 220.

The consolidative management processing module 110 is designed to manage consolidatively or integrally the states or statuses of the video encode processing module 30, the audio encode processing module 40, the video/audio/management information multiplex processing module 50, the stream buffer 60, the management information generate processing module 70, the recording medium drive processing module 80, the volatile management information expansion memory 90 and the management information expand processing module 100, respectively. The processing stages in the system according to the instant embodiment of the present invention are classified to such statuses as illustrated in FIG. 10, wherein codes are allocated to those statuses, respectively. More specifically, the status prevailing from a time point at which the management file of the recording medium 130 is expanded on the volatile management information expansion memory 90 up to a time point at which the recording is started is defined as a management information expansion status 1000 to which a code "1" is assigned. In succession, the status where the recording has not yet been started and the status prevailing from the time point of the start of the recording up to a time point at which the data of the volatile management information expansion memory 90 has completely been updated after the end of the recording are defined as a stream information recording status 1010 to which a code "2" is assigned. In succession, the status prevailing from the time point at which the data of the volatile management information expansion memory 90 has completely been updated up to the time point at which the management file on the recording medium 130 has completely been overwritten is defined as a management information expansion memory update status 1020 to which a code "3" is assigned. In succession, the status prevailing from the time point at which the management file on the recording medium 130 has completely been overwritten up to a time point at which the above-mentioned management file is copied to the management information backup file is defined as a recording medium management information update status 1030 to which a code "4" is allocated. In succession, the stage at which where the above-mentioned management file has been copied thoroughly to the management information backup file 220 is defined as a normal end status 1040 to which the code "1" is assigned. To say in another way, the normal end status is equivalent to the management information expansion status 1000. Upon every transition of the statuses mentioned above, the consolidative management processing module 110 records the corresponding codes in the nonvolatile recording status memory 120, which is a memory whose contents stored therein are not initialized regardless of breakage of electric power supply thereto.

As can be seen from the foregoing, by reading out the code from the nonvolatile recording status memory 120, checking the status corresponding to that code and performing the processing corresponding to the status as checked, the data written up to the time point at which the recording was interrupted due to unexpected breakage of the electric power supply can be remedied or repaired. A repairing method to this end will be described below as a second embodiment of the present invention.

In the following, the second embodiment of the present invention will be described in detail by reference to the drawings.

Figure 11:
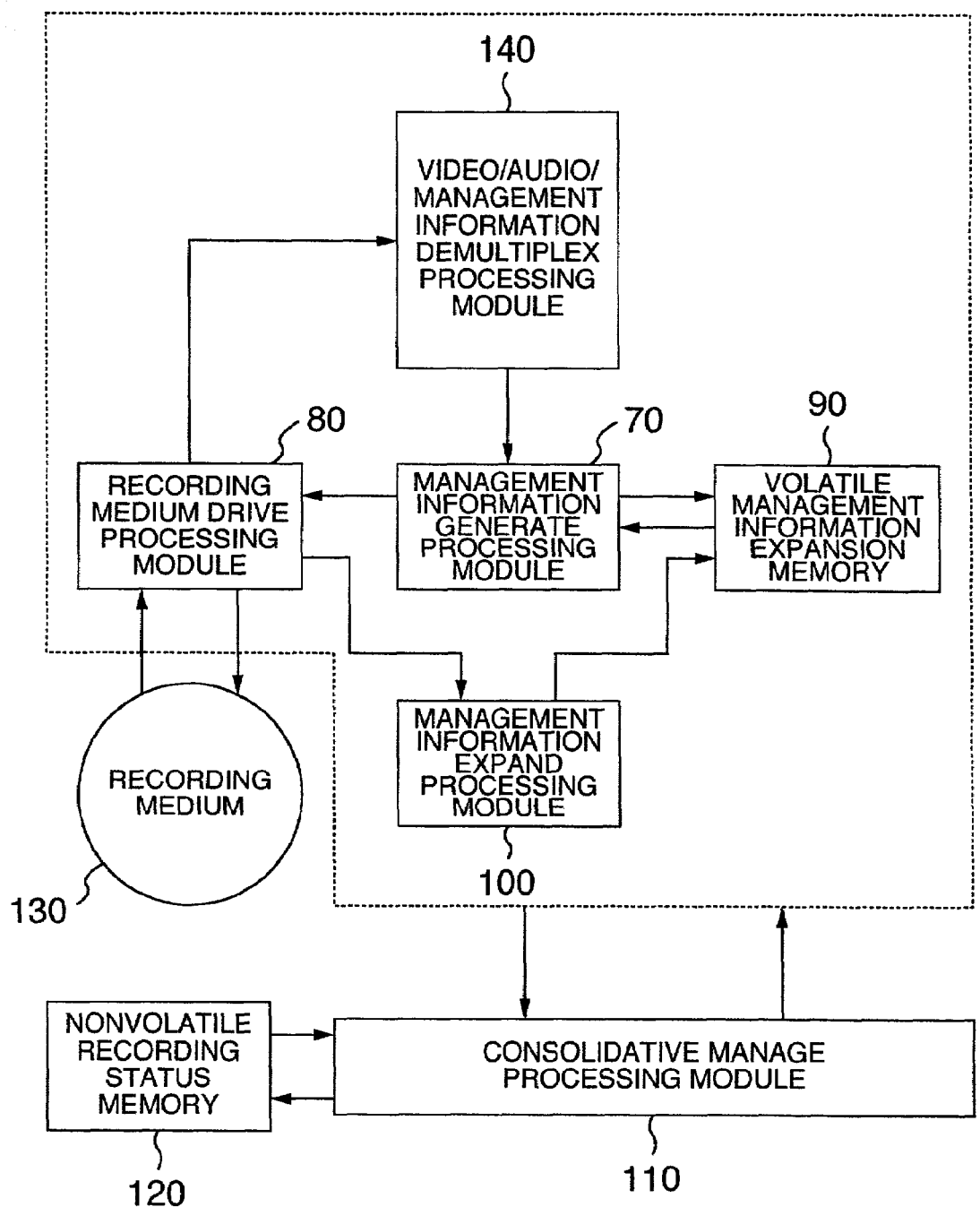
FIG. 11 is a block diagram showing a management information repairing system.

FIG. 11 is a block diagram showing a recorded information repairing apparatus according to the second embodiment of the present invention.

The recorded information repairing apparatus shown in FIG. 11 is comprised of a management information generate processing module 70, a recording medium drive processing module 80, a volatile management information expansion memory 90, a management information expand processing module 100, an consolidative management processing module 110, a nonvolatile recording status memory 120, a recording medium 130 and a video/audio/management information demultiplex processing module 140.

Figure 12:
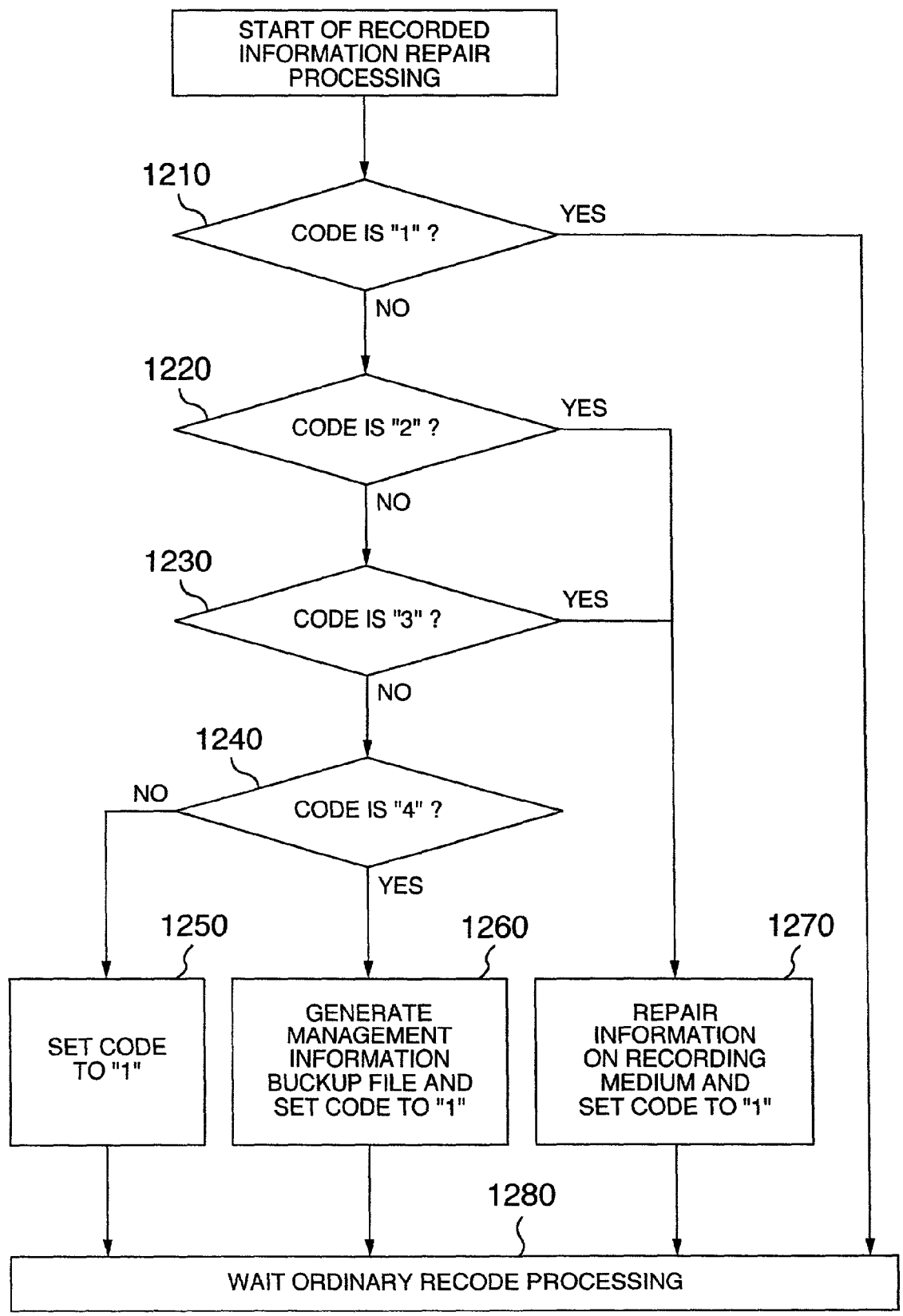
FIG. 12 is a flow chart illustrating processings executed by the management information repairing system.

In execution of the processing procedure for repairing the information recorded on the recording medium 130, the processing flow is branched in such manner as illustrated in FIG. 12 in dependence on the codes stored in the nonvolatile recording status memory 120 described previously in conjunction with the first embodiment of the invention.

When the code is found "1" in a step 1210, this indicates the normal state. Accordingly, a state waiting for an ordinary recording processing is set in a step 1280.

When the code is "2" or "3" in a step 1220 or a step 1230, this indicates the statuses where the recording has not been completed normally. Thus, the processing for repairing the information on the recording medium 130 is performed. The repair processing to this end will be described below.

On the recording medium 130, there exist the management information file 200 corresponding to the record units recorded in precedence to the record unit for which the recording has been interrupted. In the bit stream file 210, there is recorded the bit stream up to the time point at which the recording was interrupted. The management information file is read out from the recording medium 130 by way of the recording medium drive processing module 80 to be subsequently transferred to the management information expand processing module 100.

The management information expand processing module 100 develops or expands the management information file 200 onto the volatile management information expansion memory 90. On the other hand, the bit stream file 210 is read out from the recording medium 130 through the medium of the recording medium drive processing module 80 to be subsequently transferred to the video/audio/management information demultiplex processing module 140. In this conjunction, it will be noted that lots of time is taken to read out wholly the bit stream file, which is not preferable. Accordingly, only the pack as required is read out with a view to shortening the reading time. The header is searched from the trailing end portion of the bit stream file to thereby retrieve the management information pack 800. Subsequently, the management information of the management information pack 800 as retrieved is transferred to the management information generate processing module 70.

In succession, jump is made to the management information pack 800 which precedes by one to the retrieved management information pack 800 in the bit stream file 210 on the basis of the value of the GOP size 980 contained in the management information pack as illustrated in FIG. 9, whereon the information of the preceding management information pack is transferred to the management information generate processing module 70. In succession, the same processing is repeated until the GOP number 950 of the management information pack 800 shown in FIG. 9 becomes "0". The management information generate processing module 70 is designed to update the data of the volatile management information expansion memory 90.

Subsequently, the bit stream file 210 on the recording medium 130 is searched or checked from the trailing end portion of the file, the data extending from the management information pack found first through the search to the trailing end of the file is deleted. In succession, data of the volatile management information expansion memory 90 is written onto the recording medium 130. Additionally, a copy of the data written onto the recording medium is written in the management information backup file 220.

Thereafter, the code "1" is written in the nonvolatile recording status memory through the consolidative management processing module 110 in a step 1270, whereupon the state 1280 for waiting the ordinary recording processing is established.

When the code is "4" in a step 1240, this indicates the status in which the management information file 200 has normally been written on the recording medium 130 and in which the copy thereof has not been written in the management information backup file yet. Accordingly, the copy of the management information file 200 on the recording medium 130 is written in the management information backup file 220 in a step 1260. In succession, the code "1" is written in the nonvolatile recording status memory 120 by means of the consolidative management processing module 110, whereupon the state 1280 in which the ordinary recording processing is waited for is established.

When the code does not coincide with any one of codes "1", "2", "3" and "4" in the steps 1210 to 1240, respectively, this means that the nonvolatile recording status memory 120 is in the state remaining to be initialized. Consequently, the code is set to "1" in a step 1250. Needless to say, when the recording apparatus is used for the first time, the code must naturally be set to "1".

In the following, description will be made in detail of a third embodiment of the present invention by referring to the drawings.

Figure 13:
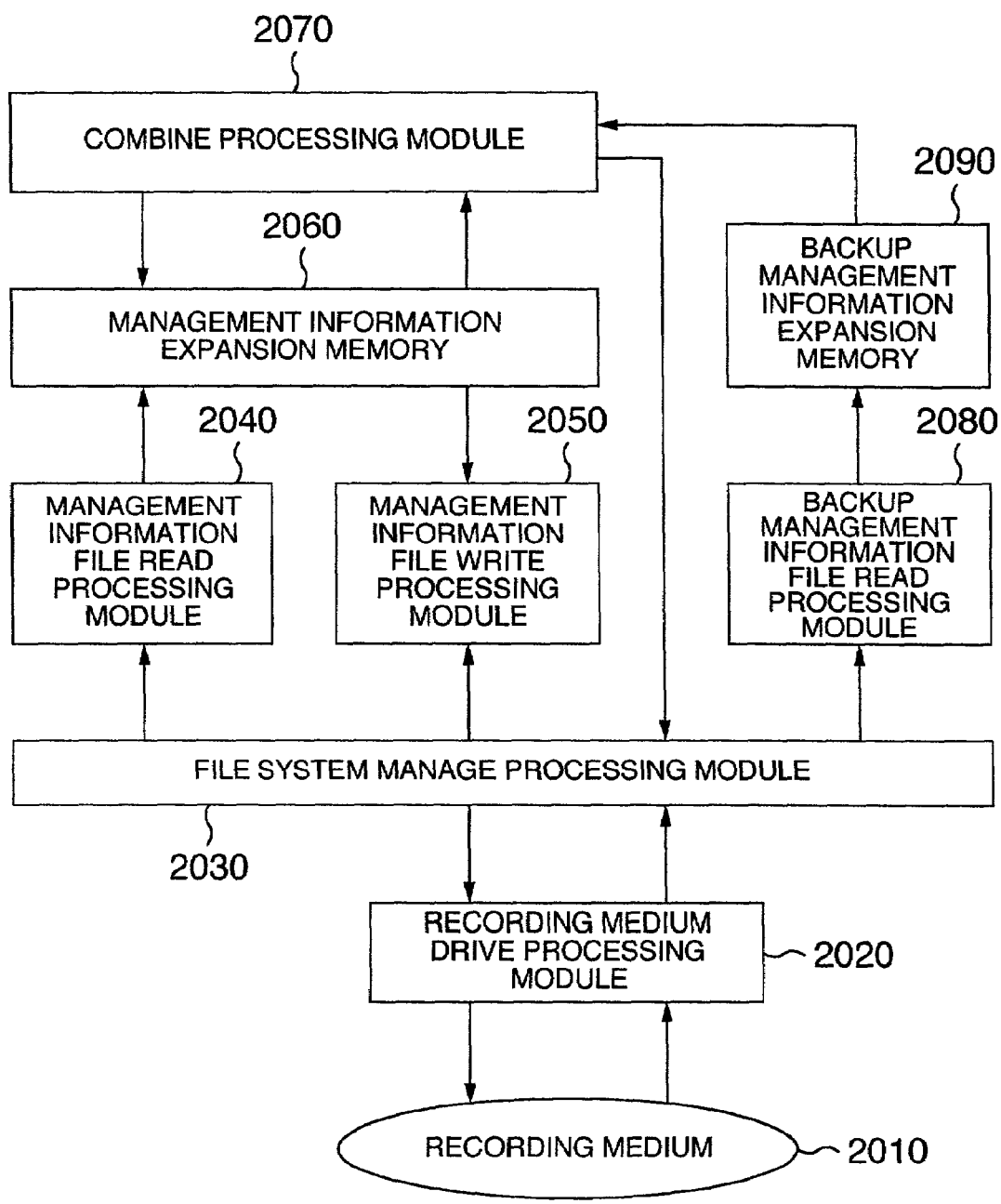
FIG. 13 is a block diagram showing an editor.

FIG. 13 is a block diagram showing an editor apparatus according to the third embodiment of the present invention.

The editor apparatus according to the third embodiment shown in FIG. 13 is comprised of a recording medium 2010, a recording medium drive processing module 2020, a file system manage processing module 2030, a management information file read processing module 2040, a management information file write processing module 2050, a management information expansion memory 2060, a combine processing module 2070, a backup management information file read processing module 2080 and a backup management information expansion memory 2090.

In the following description, it is presumed, by way of example, that the stream which conforms to the DVD Video Recording standards (hereinafter referred to simply as VR standards) is handled.

Figure 14:
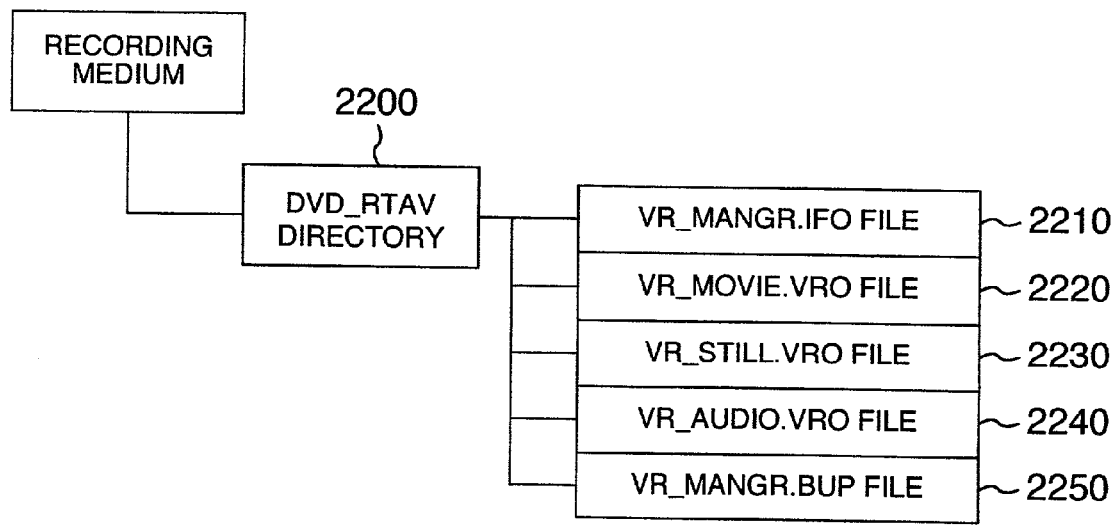
FIG. 14 is a diagram showing a structure of files recorded on a recording medium.

As can be seen in FIG. 14, according to the VR standards, a DVD_RTAV directory 2200 exists on the recording medium, wherein at a hierarchically lower level of this DVD_RTAV directory, there exist a VR_MANGR.IFO file 2210, a VR_MOVIE.VRO file 2220, a VR_STILL.VRO file 2230, a VR_AUDIO.VRO file 2240 and a VR_MANGR.BUP file 2250. The VR_MOVIE.VRO file 2220 serves as a moving picture stream data file, the VR_STILL.VRO file 2230 serves as a sill picture stream data file or a sound-accompanying still picture stream data file, and the VR_AUDIO.VRO file 2240 serves as an audio stream data file for adding an audio stream to the VR_STILL.VRO file 2230. Recorded in the VR_MANGR.IFO file 2210 are a relation establish table for establishing relations in respect to the time codes and the file locations as required for performing random access, special reproducing operations such as fast-feed, rewind and the like operations among the VR_MOVIE.VRO file 2220, the VR_STILL.VRO file 2230 and the VR_AUDIO.VRO file 2240 as well as the text information to be displayed to the user via the user interface and the time information therefor. The VR_MANGR.BUP file 2250 has utterly the same data contents as those of the VR_MANGR.IFO file 2210.

Figure 15:
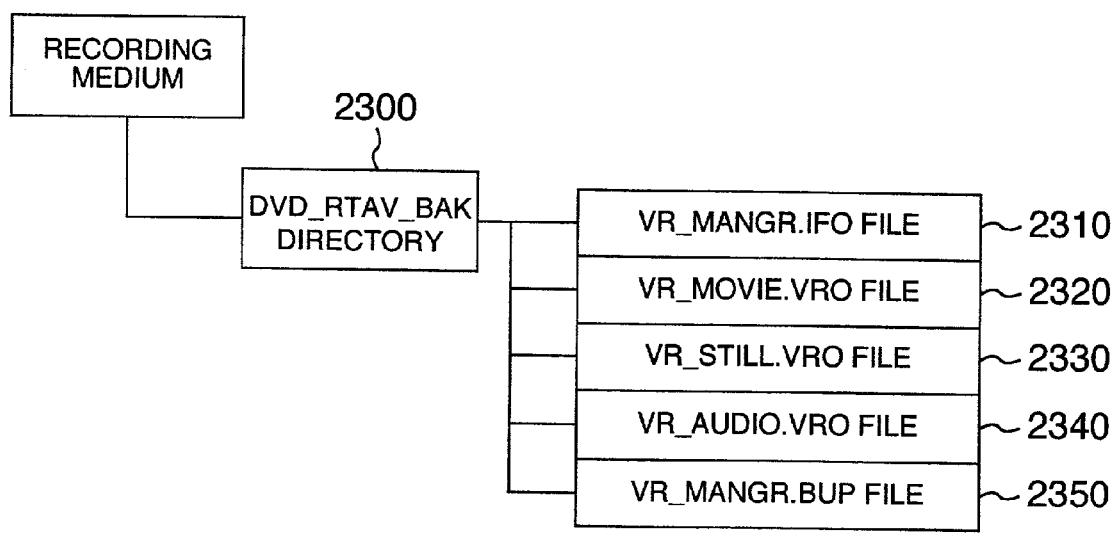
FIG. 15 is a diagram showing a structure of files recorded on the recording medium.

Existing on the recording medium 2010 in the apparatus according to the instant embodiment of the invention is a DVD_RTAV_BAK directory 2300 in addition to the DVD_RTAV directory 2200, as shown in FIG. 15. At a hierarchically lower level of the DVD_RTAV_BAK directory 2300, there exist a VR_MANGR.IFO file 2310, a VR_MOVIE.VRO file 2320, a VR_STILL.VRO file 2330, a VR_AUDIO.VRO file 2340 and a VR_MANGR.BUP file 2350, similarly to the case of the DVD_RTAV directory 2200. These files located at the hierarchically lower level of or belonging to the DVD_RTAV_BAK directory 2300 conform to the VR standards.

The VR_MANGR.IFO file 2210 in the DVD_RTAV directory 2200 recorded on the recording medium 2010 is read out by means of the recording medium drive processing module 2020 to be recognized as a file by the file system manage processing module 2030.

The management information file read processing module 2040 reads out from the file system manage processing module 2030 the VR_MANGR.IFO file 2210 which exists at the hierarchically lower level of or belonging to the DVD_RTAV directory 2200, to thereby interpret the data described in this file, the results of which are written onto the management information expansion memory 2060 as the management information expansion data.

The VR_MANGR.IFO file 2310 which exists at the hierarchically lower level of or belonging to the DVD_RTAV_BAK directory 2300 recorded on the recording medium 2010 is read out through the medium of the recording medium drive processing module 2020 to be recognized as a file by the file system manage processing module 2030.

The backup management information read processing module 2080 reads out from the file system manage processing module 2030 the VR_MANGR.IFO file 2310 which exists at the hierarchically lower level of (or belonging to) the DVD_RTAV_BAK directory 2300, to thereby interpret the data described in this file, the results of which are written onto the backup management information expansion memory 2090 as the backup management information expansion data.

The combine processing module 2070 combines consolidatively the management information expansion data stored in the management information expansion memory 2060 and the backup management information expansion data stored in the backup management information expansion memory 2090 to thereby generate newly integrated or consolidated management information expansion data, whereon the data as generated are written onto the management information expansion memory 2060.

The VR_MOVIE.VRO file 2220, the VR_STILL.VRO file 2230 and the VR_AUDIO.VRO file 2240 which exist at the hierarchically lower level of the DVD_RTAV directory 2200 and the VR_MOVIE.VRO file 2320, the VR_STILL.VRO file 2330 and the VR_AUDIO.VRO file 2340 which exist at the hierarchically lower level of the DVD_RTAV_BAK directory 2300, respectively, are consolidated into a single file without changing the physical layout of the relevant data recorded on the recording medium but by altering only the information concerning the file system. As the result of the consolidation of the files as described above, the VR_MOVIE.VRO file 2320, the VR_STILL.VRO file 2330, the VR_AUDIO.VRO file 2340, the VR_MANGR.IFO file 2310 and the VR_MANGR.BUP file 2350 which exist at the hierarchically lower level of the DVD_RTAV_BAK directory 2300 are deleted together with the DVD_RTAV_BAK directory 2300 by issuing a relevant command to the file system manage processing module 2030. Alternatively, the above-mentioned files belonging to the DVD_RTAV_BAK directory 2300 may be set invalid for the file system manage processing module 2030.

The management information file write processing module 2050 reads out the management information expansion data placed on the management information expansion memory 2060 for thereby commanding the file system manage processing module 2030 to write the above-mentioned data as the VR_MANGR.IFO file 2210 at the hierarchically lower level of the DVD_RTAV directory 2200, whereon this write command is executed by the file system manage processing module. The VR_MANGR.BUP file 2250 is also written in the similar way.

Upon reception of the command for combination of the files, deletion of the files and writing of the files, the file system manage processing module 2030 activates the recording medium drive processing module 2020 to thereby cause the information of the files to be written onto the recording medium 2010.

Through the procedure described above, the files of the VR standards recorded at the hierarchically lower level of the DVD_RTAV directory 2200 are combined with those of the VR standards recorded at the hierarchically lower level of the DVD_RTAV_BAK directory 2300, whereby these files can be combined together into one file.

Parenthetically, the directory name of the DVD_RTAV_BAK directory 2300 and the names of the files located at the hierarchically lower level of the DVD_RTAV_BAK directory are never restricted to those mentioned above in conjunction with the description of the instant embodiment of the invention. In other words, the instant embodiment of the invention can be carried out regardless of what names the directory and/or the files have and which directory the files exist in or belong to.

In the following, description will be made in detail of a fourth embodiment of the present invention by referring to the drawings. The fourth embodiment corresponds to the third embodiment of the invention except that further processings are additionally provided.

Figure 16:
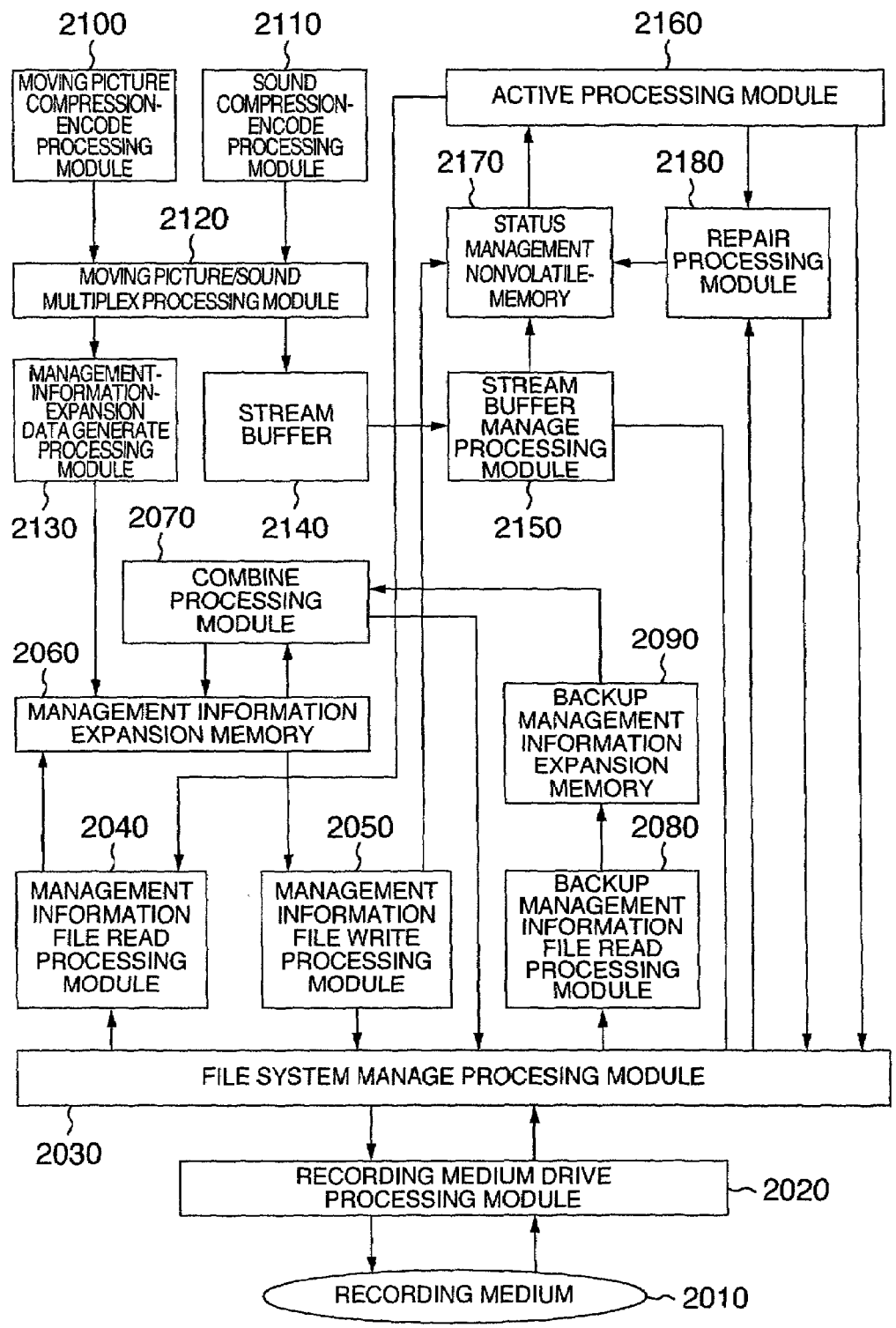
FIG. 16 is a block diagram showing a recording apparatus.

FIG. 16 is a block diagram showing a recording apparatus according to the fourth embodiment of the present invention.

The recording apparatus according to the fourth embodiment shown in FIG. 16 is comprised of a recording medium 2010, a recording medium drive processing module 2020, a file system manage processing module 2030, a management information file read processing module 2040, a management information file write processing module 2050, a management information expansion memory 2060, a combine processing module 2070, a backup management information file read processing module 2080, a backup management information expansion memory 2090, a moving picture compression-encode processing module 2100, a sound compression-encode processing module 2110, a moving picture/sound multiplex processing module 2120, a managing-information-expanded data generate processing module 2130, a stream buffer 2140, a stream buffer manage processing module 2150, an activate processing module 2160, a nonvolatile status management memory 2170 and a repair processing module 2180.

In the following description, it is presumed, by way of example, that the stream which conforms to the DVD Video Recording standards (hereinafter referred to simply as VR standards) is handled.

As can be seen in FIG. 14, according to the VR standards, there is prepared a DVD_RTAV directory 2200 recorded on a recording medium, wherein at a hierarchically lower level thereof, there are prepared a VR_MANGR.IFO file 2210, a VR_MOVIE.VRO file 2220, a VR_STILL.VRO file 2230, a VR_AUDIO.VRO file 2240 and a VR_MANGR.BUP file 2250. The VR_MOVIE.VRO file 2220 serves as a moving picture stream data file, the VR_STILL.VRO file 2230 serves as a sill picture stream data file or alternatively as a sound-accompanying still picture stream data file, and the VR_AUDIO.VRO file 2240 serves as an audio stream data file for adding an audio stream to the VR_STILL.VRO file 2230. Recorded in the VR_MANGR.IFO file 2210 are a relation establish table for establishing relations in respect to the time codes and the file locations as required for performing random access, special reproducing operations such as fast-feed, rewind and the like operations among the VR_MOVIE.VRO file 2220, the VR_STILL.VRO file 2230 and the VR_AUDIO.VRO file 2240 as well as the text information to be displayed to the user via the user interface and the time information therefor. The VR_MANGR.BUP file 2250 has utterly the same data contents as those of the VR_MANGR.IFO file 2210.

At first, description will be made of the processings for recording.

The moving picture compression-encode processing module 2100 compresses and encodes an analog moving picture signal to thereby transfer resultant moving picture stream data to the moving picture/sound multiplex processing module 2120.

The sound compression-encode processing module 2110 compresses and encodes an analog audio signal to thereby transfer resultant sound stream data to the moving picture/sound multiplex processing module 2120.

The moving picture/sound multiplex processing module 2120 multiplexes the encoded moving picture stream data and the encoded sound stream data to transfer the multiplexed stream data to the stream buffer 2140 on one hand. On the other hand, the moving picture/sound multiplex processing module 2120 transfers to the management-information-expansion data generate processing module 2130 the information required for generating the VR_MANGR.IFO 2210 which conforms to the VR standards. In this manner, generation of the multiplexed stream and generation of the management information expansion data are carried out.

The stream buffer manage processing module 2150 issues commands to the file system manage processing module 2030 to monitor the amount of the data stored accumulatively in the stream buffer 2140, extract the multiplexed stream data from the stream buffer every time the stored data reaches a predetermined amount and write the data as extracted onto the recording medium 2010 in the form of a file. The management information file write processing module 2050 selects the VR_MOVIE.VRO file 2220, the VR_STILL.VRO file 2230 or the VR_AUDIO.VRO file 2240 in conformance to the type of the record to thereby write the multiplexed stream data.

The management-information-expansion data generate processing module 2130 generates the management information expansion data in the management information expansion memory 2060 on the basis of the information transferred from the moving picture/sound multiplex processing module 2120 in the course of recording operation.

After completion of recording, the management information file write processing module 2050 reads out the management information expansion data placed on the management information expansion memory 2060 to thereby issue a command to the file system manage processing module 2030 for writing the above-mentioned read data in the form of the VR_MANGR.IFO file 2210 at the hierarchically lower level of the DVD_RTAV directory 2200. The VR_MANGR.BUP file 2250 is also written through the similar processing.

Defined on the nonvolatile status management memory 2170 is such statuses as shown in FIG. 17. By way of example, the state of normal termination of recording is defined as "normal end status" 2500 to which a code "0" is assigned. The status prevailing from the time point at which the stream buffer manage processing module 2150 starts to write the data of the stream buffer 2140 in the form of a file up to the time point at which the recording is completed is defined as "stream write status" 2510 to which a code "1" is assigned. The status where the VR_MANGR.IFO file 2210 is being written after completion of the recording is defined as "IFO write status" 2520 to which a code "2" is assigned. Further, the status where the VR_MANGR.BUP file 2250 is being written is defined as "BUP write status" 2530 to which a code "3" is assigned.

The stream buffer manage processing module 2150 is designed to write in the nonvolatile status management memory 2170 the "stream write status" 2510 at a predetermining timing while the management information file write processing module 2050 is designed to write the "normal end status" 2500, "IFO write status" 2520 and "BUP write status" 2530 in the nonvolatile status management memory 2170, respectively, at predetermined timings. In response to the reception of a file write command, the file system manage processing module 2030 activates the recording medium drive processing module 2020 to thereby allow the information of the file to be written onto the recording medium 2010.

At this juncture, let's suppose that the electric power supply to the recording apparatus according to the present invention is unexpectedly broken. In that case, the status of the processing performed at the time of shutdown of the power supply will be written in the nonvolatile status management memory 2170. By way of example, in the case where the electric power supply is unexpectedly broken when the status "stream write status" is prevailing, the code "1" defining as the "stream write status" 2510 will be written in the nonvolatile status management memory 2170.

Accordingly, at the time point the power supply is restored, it is possible to know the status of the processing which was being executed by the recording apparatus upon occurrence of the unexpected breakage of power supply by referencing the information written in the nonvolatile status management memory 2170. More specifically, when the information written in the nonvolatile status management memory 2170 is "1", it can be determined that the power supply was unexpectedly broken when the recording apparatus was operating in "stream write status" 2510.

Figure 18:
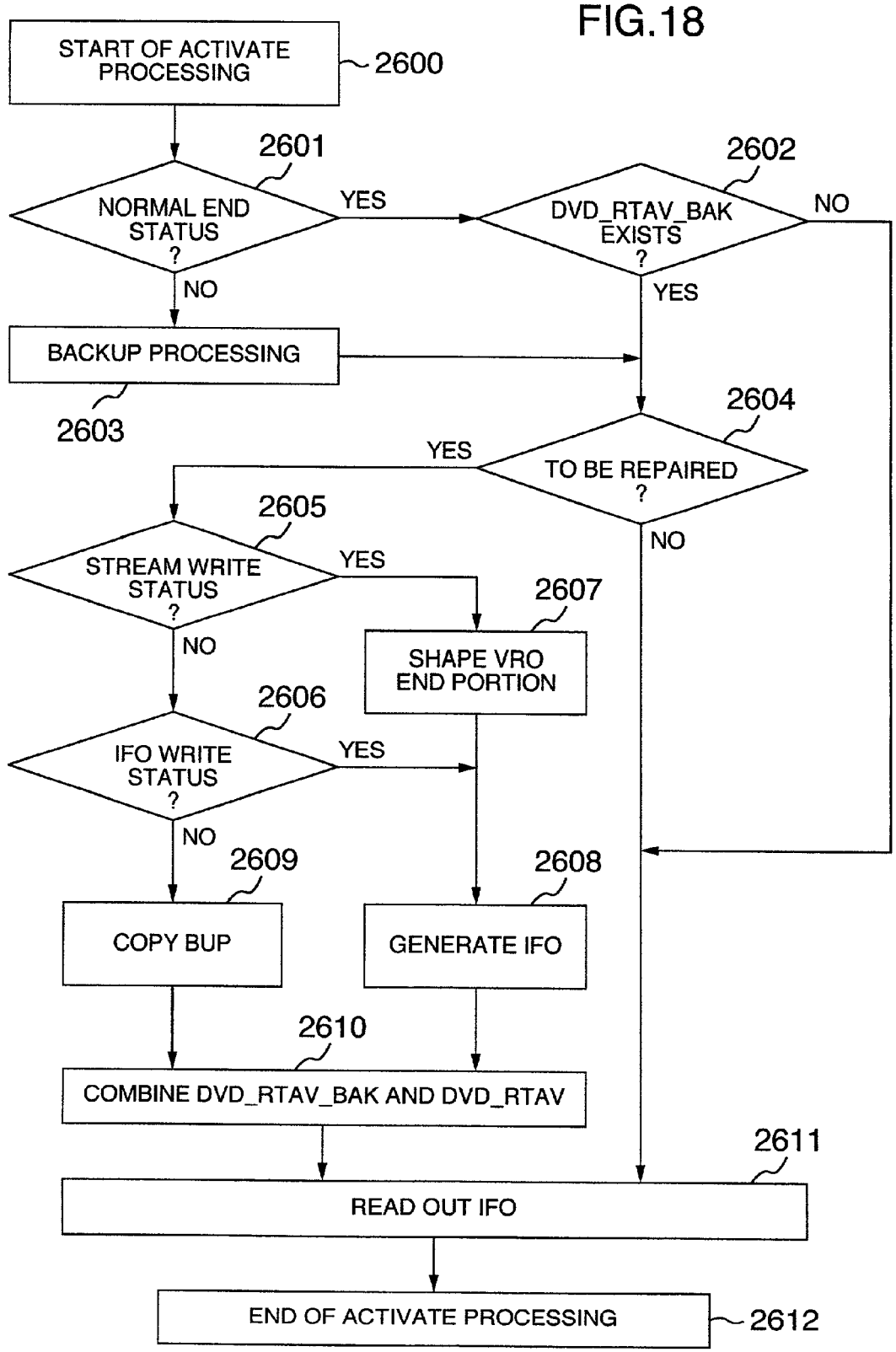
FIG. 18 is a flow chart illustrating an activate processing in the recording apparatus.

Upon activation, the activate processing module 2160 monitors or supervises the data of the nonvolatile status management memory 2170 to thereby perform processing operations in such a manner as illustrated in a flow chart of FIG. 18 in dependence on the data status.

When the power supply to the recording apparatus is turned on, the activate processing module 2160 starts the processing from a step 2600. It is decided in a step 2601 as to whether or not the status of the nonvolatile status management memory 2170 is "normal end status". When "normal end status" is decided, the processing proceeds to a step 2602. By contrast, unless "normal end status" is decided, the DVD_RTAV directory 2200 is renamed to the DVD_RTAV_BAK directory 2300, whereon the status of the nonvolatile status management memory 2170 is recorded on the recording medium 2010 at an appropriate location thereof as the status management data and then the status of the nonvolatile status management memory 2170 is set to "normal end status" 2500 in a step 2603. Subsequently, the processing proceeds to a step 2604.

It has been described above that the processing for recording the status of the nonvolatile status management memory 2170 as the status management data at the appropriate location on the recording medium 2010 is performed. In this conjunction, it should however be mentioned that the processing for recording in advance the state of the nonvolatile status management memory 2170 as the status management data on the recording medium 2010 at an appropriate location thereof may be performed. In that case, the state of the nonvolatile status management memory 2170 will have been recorded as the status management data at the proper location on the recording medium 2010 when the power supply is turned on again. Accordingly, in this case, the processing for recording the state of the nonvolatile status management memory 2170 as the status management data on the recording medium 2010 at an appropriate location thereof upon restoration of the power supply can be spared.

In a step 2602, it is checked whether or not the DVD_RTAV_BAK directory 2300 exists on the recording medium 2010. Unless the DVD_RTAV_BAK directory is present on the recording medium 2010, the processing makes transition to a step 2611. If it exists, the processing proceeds to a step 2604. To say in another way, transition to the step 2604 is made when the DVD_RTAV directory 2200 has been altered to the DVD_RTAV_BAK directory 2300 without completing normally the recording on the recording medium 2010. In that case, the data of hierarchically lower level for the DVD_RTAV_BAK directory 2300 for which the processing has not normally been terminated are repaired or restored to the normally terminated or completed state, and then a query as to combination with the existing data of the DVD_RTAV directory 2200 is issued to the user. If the user selects the repair, the processing makes transition to the step 2605 while otherwise to the step 2611. In a step 2605, decision is made as to whether or not the status of the status management data which corresponds to that of the nonvolatile status management memory 2170 recorded previously on the recording medium 2010 at an appropriate location thereof is "stream write status" 2510. If the data status command is "stream write status" 2510, then one of the VR_MOVIE.VRO file 2320, the VR_STILL.VRO file 2330 and the VR_AUDIO.VRO file 2340 which is located at hierarchically lower level of the DVD_RTAV_BAK directory 2300 and which is broken off at the trailing end portion is found out in a step 2607, whereon the unwanted portion of the file as found is deleted with the trailing end portion thereof being newly shaped, whereon the processing makes transition to a step 2608. On the other hand, unless the status of the status management data is "stream write status" 2510, transition is made to a step 2606. In the step 2606, it is decided whether the status of the status management data is "IFO write status" 2520. If it is "IFO write status" 2520, transition is made to a step 2608. Unless it is "IFO write status" 2520, transition is made to a step 2609 in which the VR_MANGR.BUP file 2350 which is at hierarchically lower level of the DVD_RTAV_BAK directory 2300 is copied onto the VR_MANGR.IFO file 2310, whereon transition is made to a step 2610. In the step 2608, information required for the portion of the VR_MANGR.IFO file 2310 where no information has been recorded is extracted from the VR MOVIE.VRO file 2310 or the VR_STILL.VRO file 2320 or VR_AUDIO.VRO file 2330 to thereby regenerate the VR_MANGR.IFO file 2310. In a step 2610, the DVD_RTAV directory 2200 and the DVD_RTAV_BAK directory 2300 are combined integrally to thereby generate newly a DVD_RTAV directory 2200, as described hereinbefore in conjunction with the first embodiment of the invention, whereon the processing procedure makes transition to a step 2611. In the step 2611, a command is issued to the management information read processing module 2040 for reading out the VR_MANGR.IFO file 2210 which is located at hierarchically lower level of the DVD_RTAV directory 2200. Now, the activate processing is terminated in a step 2612.

Through the processing procedure described above, the recording processing can be started without need for necessarily executing the repair processing upon restarting of the electric power supply after it has unexpectedly been broken in the course of recording operation which has thus been stopped.

As can be seen in FIG. 14, according to the VR standards, the DVD_RTAV directory 2200 exists on the recording medium, wherein at a hierarchically lower level thereof, there exist the VR_MANGR.IFO file 2210, the VR_MOVIE.VRO file 2220, the VR_STILL.VRO file 2230, the VR_AUDIO.VRO file 2240 and the VR_MANGR.BUP file 2250. In this conjunction, it is noted that according to the VR standards, any one of these files is not allowed to exist in plurality underneath the DVD_RTAV directory 2200 on the recording medium. Accordingly, when the recording operation is interrupted because of unexpected breakage of the electric power supply in the course of recording operation and thus when these files belonging to the DVD_RTAV directory 2200 are in the state incapable of being normally reproduced, there may arise such situation that the recording operation can no more be started so far as these files are not repaired to the state which allow the normal reproduction to be performed.

According to the teaching of the invention incarnated in the embodiment described above, it is possible to record the information to be newly recorded in a renewed DVD_RTAV directory in the form of a file conforming to the VR standards when the recording operation is restarted from the interrupted state by altering the name of the DVD_RTAV directory containing the file insusceptible to normal reproduction to the DVD_RTAV_BAK directory. Thus, it is possible to start the recording operation without repairing the file which is in the state insusceptible to normal reproduction.

Furthermore, in the case of the embodiment of the invention described above, the file which exists in the name-altered DVD_RTAV_BAK directory and which can not normally be reproduced can be combined with the file which exists in the DVD_RTAV directory and which is based on the VR standards by carrying out the repair processing as the user desires.

As will now be apparent from the foregoing description, according to the invention incarnated in the embodiment described above, it is possible to determine selectively whether or not the file repairing is to be executed in the event that power supply is turned on after it has unexpectedly been broken in the course of the recording operation. In that case, even when selection is made such that the repairing is not performed, a succeeding recording operation can be started. At this juncture, it should also be mentioned that the repairing takes relatively lots of time. Consequently, when the electric power supply is unexpectedly interrupted with the recording operation being stopped in the course of outdoor photographing performed with a recording apparatus such as a camera, it has heretofore been impossible to start a succeeding recording operation on one and the same recording medium immediately upon restarting of the power supply with the repairing operation being executed at once. By contrast, according to the teaching of the invention incarnated in the embodiment described above, the recording operation can again be started even for one and the same recording medium immediately upon restoration of the electric power supply.

To say in another way, by virtue of the arrangement described above in conjunction with the embodiment of the invention, in the event that the power supply is unexpectedly broken in the course of recording operation which is thus stopped, it is possible to start speedily the recording operation by restarting power supply without need for executing any repairing or remedying processing. Moreover, since the power consumption involved in executing the processing for repairing can be spared, the electric power required for the recording processing can be protected against extraneous consumption.

By way of example, it is supposed that power supply is broken unexpectedly during outdoor recording operation with the aid of a camera which is supplied with electric power from a battery, as a result of which the recording operation is forced to stop. In that case, when the power supply is enabled again, the electric power supplied from the battery can be used for the recording processing without consuming the electric power of the battery for the repairing processing. Incidentally, the file which can not normally be reproduced may be repaired later on by making use of, for example, the interior wiring power supply at the time point when the user desires it without resorting to the use of the electric power supply from the battery.

In addition, in the case of a fixed-type information recording/reproducing apparatus which is adapted to operate under power supply from an interior wiring, by way of example, the recording processing can speedily be started without carrying out any repair processing by restarting the power supply in the event the power supply is broken unexpectedly in the course of recording operation which is thus stopped. In other words, the concept of the invention incarnated in the embodiment described above can equally be applied effectively to the fixed-type information recording/reproducing apparatus as well.

In conjunction with the first and second embodiments of the present invention, description has been made concerning the technique that when power supply breakage takes place suddenly during the recording operation, such restoring operation is enabled upon restarting of the electric power supply that the status flag written in the nonvolatile memory mentioned hereinbefore is read out to thereby perform the repairing of the file by extracting the information required for the repairing and contained in the stream data on the basis of the status flag as read out. In the following, description will be made of further improvements taught by the present invention, i.e., a repairing method which may be carried out in the restoring operation performed upon interruption of electric power supply in the course of recording operation for repairing the management information file and the AV data file themselves on the basis of the stream data without need for previously adding the information and then a repairing method of repairing the management information file and the AV data file such that no inconvenience is thereby brought about in the succeeding recording/reproducing operation even in the case where the stream data is partially injured.

Figure 20:
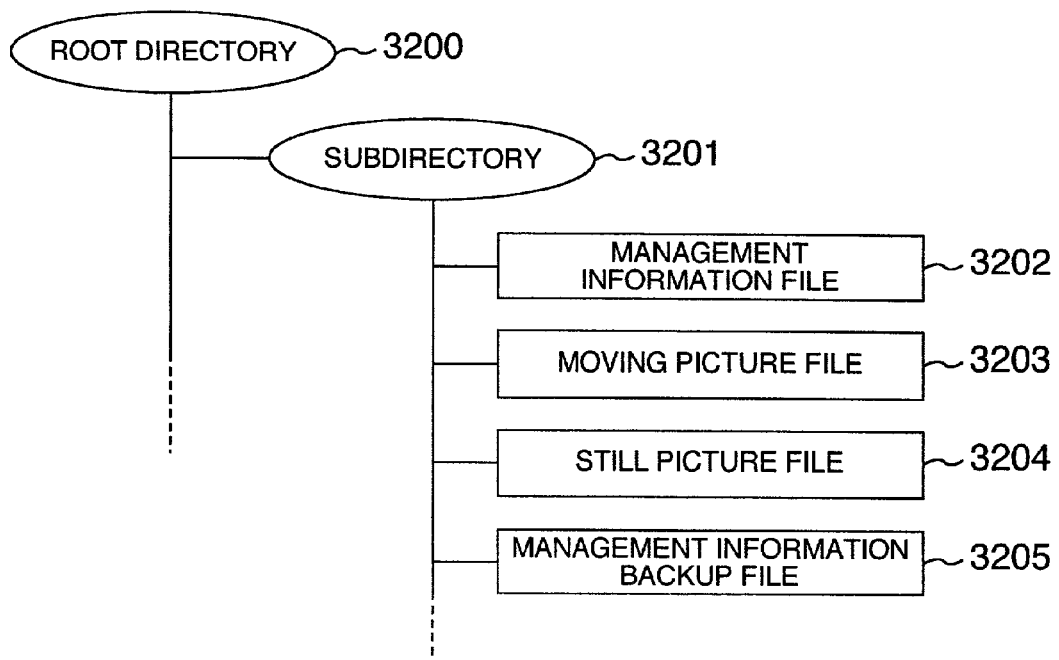
FIG. 20 is a diagram for illustrating a directory structure on a disk.

FIG. 20 is a view for illustrating in more detail the data structure for the files generated on the disk through the recording operation described previously. As can be seen, a subdirectory 3201 for a real time basis recording operation is disposed underneath a root directory 3200, wherein the management information files and the AV data files as generated are all disposed underneath the subdirectory 3201. In a management information file 3202, management information for the recorded AV data is written. The management information includes address information and attribute information of the AV data and additionally encoding parameter information as well as reproduced list information for edition. A moving picture file 3203 is a file destined for recording as the AV data the stream data resulting from encoding and multiplexing of the moving picture data or sound data recorded simultaneously with the moving picture data. In this conjunction, it should be mentioned that for newly moving picture data, any additional file is not generated separately but the moving picture data to be recorded newly are sequentially written additionally in this moving picture file. Further, a still picture file 3204 is a file destined for recording as the AV data the stream data resulting from encoding and multiplexing of the still picture data or sound data recorded simultaneously with the still picture data. As in the case of the moving picture data, the still picture data to be recorded newly are sequentially written additionally in this file. Further written in a management information backup file 3205 are the same contents as the management information file 3202. This management information backup file is used for backing up the data of the management information file 3202 when the latter is damaged.

Reproduction of the AV data from the disk is performed on the basis of the information such as the reading position, attributes of the picture data or the like, all obtained from the management information file 3202. To say in another way, the contents of the management information file 3202 have to correspond strictly to the contents of the moving picture file 3203 or the still picture file 3204. However, when the recording is interrupted, for example, due to unexpected breakage of power supply in the course of the real time recording operation, as mentioned previously, the moving picture file 3203 and the still picture file 3204 will be recorded without meeting the predetermined requirements concerning the format. Of course, the management information file 3202 may also be recorded incorrectly although it depends on the timing. Thus, there may arise the possibility of incoincidence or discrepancy among the contents of these files. In the following, a method of repairing or canceling out incoincidence or discrepancy in the data between the management information file and the AV data file without writing additionally any specific information in the AV data file itself will be elucidated by reference to the drawings.

Figure 19:
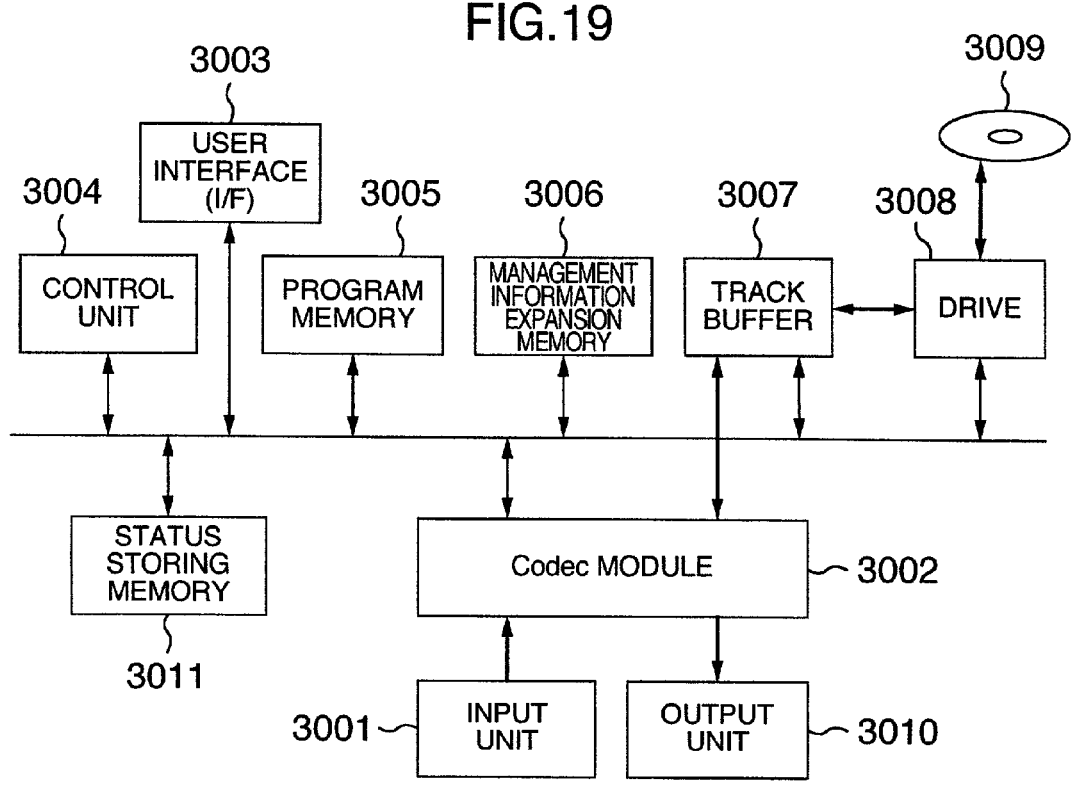
FIG. 19 is a block diagram showing an information recording/reproducing apparatus according to a fifth embodiment of the present invention.

FIG. 19 is a block diagram showing an information recording/reproducing apparatus according to a fifth embodiment of the present invention. In the figure, reference numeral 3001 denotes an input unit, 3002 denotes an encoder/decoder module (hereinafter referred to as the Codec module), 3003 denotes a user interface (I/F), 3004 denotes a control unit, 3005 denotes a program memory, 3006 denotes a management information expansion memory, 3007 denotes a track buffer, 3008 denotes a drive, 3009 denotes an optical disk, 3010 denotes an output unit and numeral 3011 denotes a status storing memory.

At first, description will be directed to operations involved in the recording. Picture data and sound data inputted through the input unit 3001 are encoded in the Codec module 3002 in accordance with a predetermined encoding scheme, whereby the information is compressed in the amount while being sequentially multiplexed. Stream data resulting from the multiplexing is temporarily stored once in the track buffer 3007 for absorbing or canceling out difference between the encoding rate and the transfer rate of the drive 3008, whereon the stream data are recorded sequentially onto the optical disk 3009 through the drive 3008. In the recording on the optical disk 3009, the moving picture data is written additionally in the form of the moving picture file 3203 while the still picture data being written additionally in the still picture file 3204, as described previously. The control unit 3004 is designed to perform control operations for the individual components mentioned above on the basis of commands inputted by the user through the user interface (I/F) 3003, wherein proper control contents are loaded by performing read/write operation on the program memory 3005, as occasion requires. Although the Codec module 3002 is shown generally en bloc, it should be understood that the Codec module 3002 may be implemented in such a composite structure that the encoding is partially carried out by means of hardware with the other part of encoding and the succeeding multiplexing being realized softwarewise under the control of the control unit 3004.

Furthermore, because the management information file generated upon recording is difficult to be recorded on the optical disk 3009 concurrently with the AV data file on the real time basis, the management information file is once expanded for the purpose of updating on the management information expansion memory 3006 to be subsequently recorded on the optical disk 3009 by overwriting in the form of the management information file 3202 as described previously. In the case where the AV data are to be initially recorded on the optical disk 3009, the management information is newly generated to be expanded on the management information expansion memory 3006. However, when the AV data is to be additionally written on the optical disk which has the AV data having been recorded in the past, the management information is read out from the optical disk 3009 to be subsequently expanded on the management information expansion memory 3006. Additionally, in succession to the recording of the management information file 3202, the management information of the same contents is overwritten on the optical disk 3009 as the management information backup file 3205.

The status storing memory 3011 is implemented as a nonvolatile memory in which the information corresponding to the recording status described above (hereinafter referred to as the status flag) is stored under the control of the control unit 3004.

At this juncture, operation involved in the reproducing operation will also be described. The processings for the reproducing operation are executed by following reversely the flow of processings which are involved in the recording operation described previously by reference to FIG. 19. Namely, the moving picture file 3203 or the still picture file 3204 is read out from given data location on the optical disk 3009 by means of the drive 3008 to be subsequently stored once as the stream data in the track buffer 3007. Thereafter, the stream data is read out from the track buffer 3007 after the difference between the transfer rate of the drive and the encoding rate of the picture/sound data having been absorbed. In the Codec module 3002, the picture data and the sound data are demultiplexed and decoded to be outputted through the output unit 3010 in an appropriate signal format.

As in the case of the recording operation, the control unit 3004 is in charge of controlling the constituents or components mentioned above by loading appropriate contents from the program memory 3005. However, in the case of the reproducing operation, the management information file 3202 is read out from the optical disk 3009 by means of the drive 3008 in precedence to reading the stream data, whereon the contents of the management information file are expanded on the management information expansion memory 3006. The commands of the user inputted through the user interface (I/F) 3003 are interpreted by the control unit 3004. In this manner, the reproducing operation described above is carried out in conformance with the management information expanded on the management information expansion memory 3006.

At this juncture, description will be made in more detail of the status flags which are stored in the status storing memory 3011 as mentioned previously.

FIG. 21 shows, by way of example, contents of several status flags recorded in the status storing memory 3011. In the recording operation described above, a flag '1' is assigned to the status prevailing from the time point at which the recording of the moving picture file 3203 is started to the time point at which the writing operation for the optical disk 3009 is completed. Similarly, a flag '2' is assigned to the status prevailing from the time point at which recording of the management information file 3202 is started in succession to the recording of the moving picture file 3203 to the time point at which the recording of the management information file is completed. A flag '3' is assigned to the status prevailing from the time point at which recording of the still picture file 3204 is started to the time point at which the recording of the still picture file is ended. A flag '4' is assigned to the status prevailing from the time point at which the recording of the management information file 3202 is started in succession to the recording of the still picture file 3204 to the time point at which the recording of the management information file is completed. A flag '5' is assigned to the status prevailing from the time point at which editing operation or edition such as partial deletion of the moving picture file 3203 or the still picture file 3204 or the like is started to the time point at which the editing operation of the above-mentioned file is completed. A flag '6' is assigned to the status prevailing from the time point at which the editing operation such as partial rewriting of the management information file 3202 without being accompanied with manipulation of the AV data or the like is started to the time point at which the editing operation described just above is completed. A flag '7' is assigned to the status prevailing from the start to the end of the recording operation of the management information backup file 3205. Further, a flag '0' is assigned to all the other statuses than those statuses to which the above-mentioned flags are assigned. Such other statuses may include the status in which reproducing operation is being carried out and so forth.

Next, description will be directed to the repairing operations in consideration of the status flags mentioned above. In the case where breakage of the power supply to the apparatus takes place unexpectedly, the status flag must indicate one of the values '0' to '7' mentioned above, wherein the indicated flag value is held in the status storing memory 3011. Since the status storing memory 3011 is a nonvolatile memory, the contents thereof can not be erased even when the power supply to the memory is interrupted. When the power supply is restarted after breakage thereof, the control unit 3004 checks the status flag stored in the status storing memory 3011 to thereby execute the repair processing while making decision as to the contents indicated by the status flags.

Figure 22:
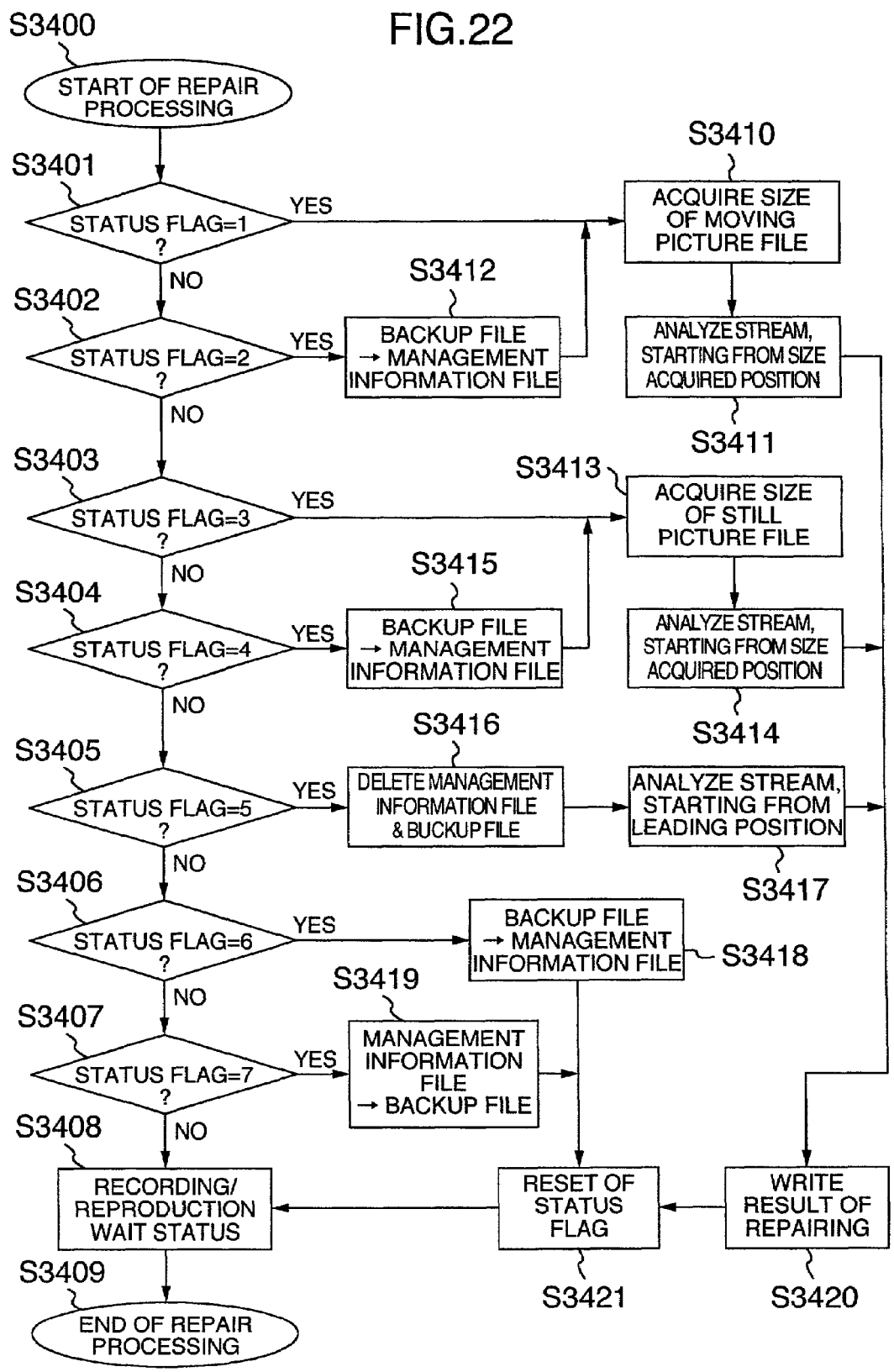
FIG. 22 is a view for illustrating schematically and generally a flow of repair processings executed in accordance with the status flags.

FIG. 22 illustrates in general a series of repair processings executed, starting from the check of the status flags by the control unit 3004. In a step S3400, the repair processing procedure is started. In steps S3401 to S3407, decision is made as to the relevant status flags, respectively. By way of example, in the case where the status flag is '0', decisions in the steps S3401 to S3407 will all result in negation "No". In that case, in a step S3408, recording/reproduction waiting state is set, whereon the repair processing procedure comes to an end in a step S3409.

Figure 23:
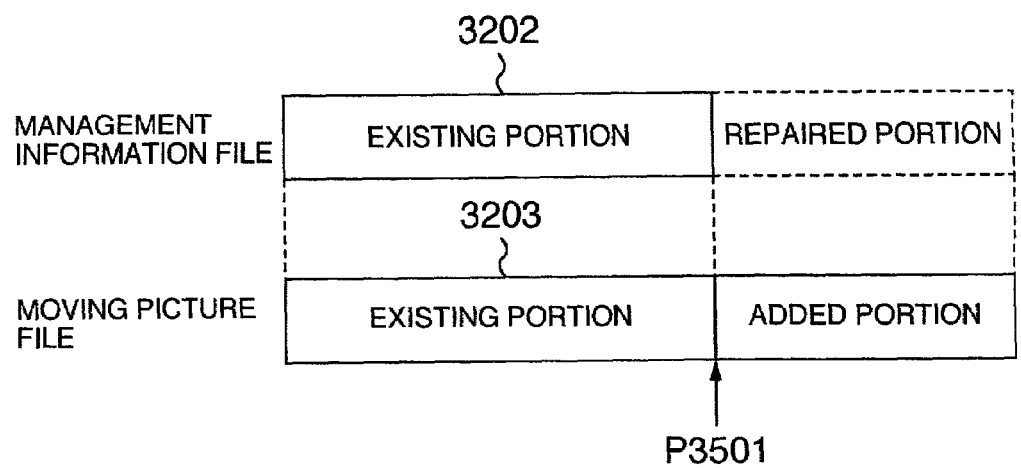
FIG. 23 is a view for illustrating a data status on a disk upon occurrence of power supply breakage in the course of a moving picture file recording.

FIG. 23 shows, by way of example, the state of the management information file 3202 and that of the moving picture file 3203 in the case where the status flag is '1'. Because it is presumed that the power supply breakage occurs in the course of recording of the moving picture data, only the information recorded in the moving image file 3203 up to the time point for starting the recording operation (indicated by a point P3501) is reflected in the management information file 3202, giving rise to incoincidence or discrepancy in the contents between the management information file 3202 and the moving picture file 3203. Accordingly, in a step S3410 succeeding to the step S3401, the management information file 3202 is expanded on the management information expansion memory 3006 to thereby acquire the information concerning the size of the moving picture file 3203 from the information recorded in the expanded management information file 3202. Since the size acquired in this way represents the very point P3501 in the moving picture file 3203, the data of the moving picture file 3203 succeeding to this point P3501 is read out from the optical disk 3009 to analyze the stream data sequentially in a step S3411 for thereby repairing the defective portion of the stream data itself while repairing concurrently the management information file 3202 by adding the relevant data which the management information file 3202 lacks. Upon completion of the repairing operation, the result of repairing is recorded onto the optical disk 3009 in a step 3420. In that case, not only the management information file 3202 and the moving picture file 3203 are recorded but also the management information backup file 3205 which has the same contents as those of the management information file 3202 is recorded as well. In this conjunction, such arrangement may equally be adopted that the moving picture file 3203 is recorded appropriately on the optical disk 3009 concurrently with the progress of the repairing operation in the step S3411 instead of being recorded in the step S3420. In a step S3421, the status flag of the status storing memory 3011 is reset to '0' because of completion of the repairing operation. Subsequently, the recording/reproduction waiting state is set in the step S3408, whereon the repair processing is terminated in the step S3409.

When the status flag is '2', this means that because of the power supply breakage in the course of recording of the management information file 3202, it is uncertain whether or not the contents thereof have been recorded correctly. Thus, in the step S3412 succeeding to the step S3402, the contents of the management information backup file 3205 are expanded on the management information expansion memory 3006 instead of expanding the contents of the management information file 3202. The processings in the succeeding steps are essentially same as those executed when the status flag is '1' as described above. Namely, the size of the moving picture file 3203 is acquired from the management information expanded in the step S3410, which is followed by the step S3411 where the contents of the moving picture file 3203 which succeed to the point P3501 are read out from the optical disk 3009 for analyzing the stream data to thereby execute the repair processing.

When the status flag is '3', this means that in contrast to the case where the status flag '1', the moving picture file 3203 has been replaced by the still picture file 3204. Similarly to the operations described above, in a step S3413 succeeding to the step S3403, the management information file 3202 is expanded on the management information expansion memory 3006 to thereby acquire the information concerning the size of the still picture file 3204 from the information recorded in the expanded management information file. In succession, in a step S3414, information or data of the still picture file 3204 which succeeds to the size information acquired as mentioned above is read out from the optical disk 3009 for analyzing the stream data sequentially to thereby repair defective portion(s) of the stream data itself while repairing concurrently the management information file 3202 by adding the relevant data which the management information file 3202 lacks. Upon completion of the repairing operation, the result of repairing is recorded onto the optical disk 3009 in the step 3420 with the status flag held by the status storing memory 3011 being reset to '0' in the step S3421, and then the recording/reproduction waiting state is set in the step S3408, whereon the repair processing is terminated in the step S3409.

When the status flag is '4', this means that because of occurrence of the power supply breakage in the course of recording of the management information file 3202, it is uncertain whether or not the contents thereof have been recorded correctly, similarly to the case where the status flag is '2'. Thus, in a step S3415 succeeding to the step S3404, the contents of the management information backup file 3205 are expanded on the management information expansion memory 3006 instead of expanding the contents of the management information file 3202. The processings in the succeeding steps are essentially same as those executed when the status flag is '3'. Namely, the information concerning the size of the still picture file 3204 is acquired from the management information expanded in the step S3413, which is followed by the step S3414 where the contents of the still picture file 3203 which succeed to the size information acquired as described above are read out from the optical disk 3009 for analyzing the stream data to thereby execute the repair processing.

Figure 24:
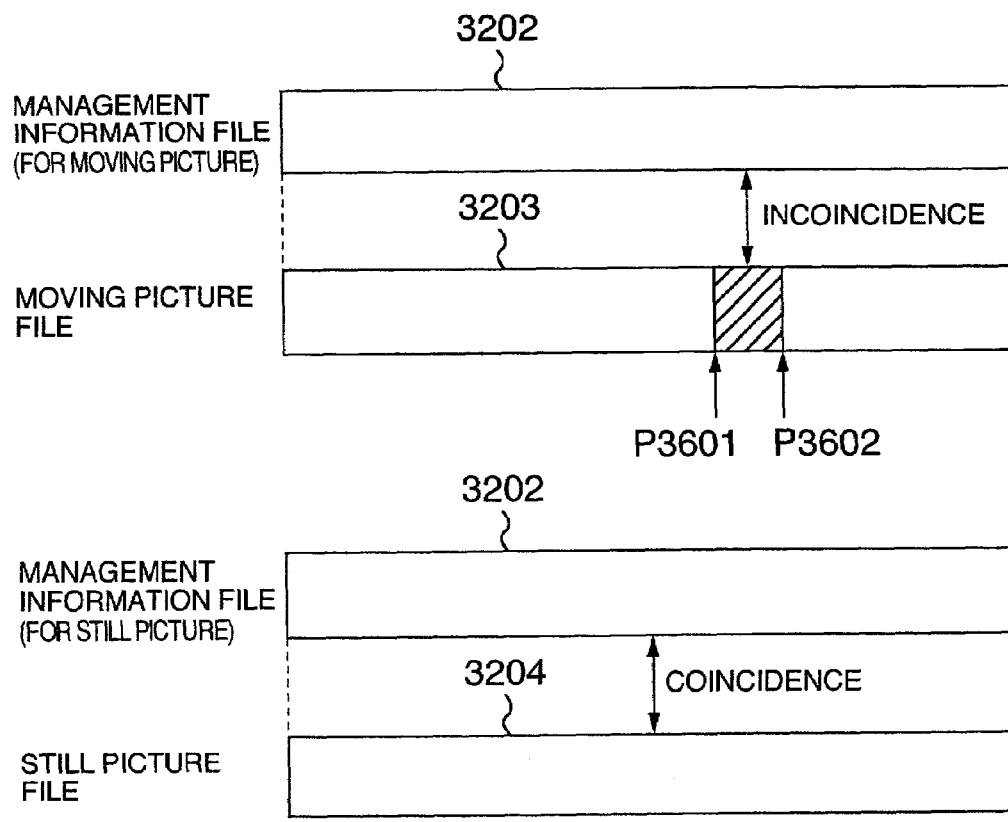
FIG. 24 is a view for illustrating a data status on a disk upon occurrence of power supply breakage in the course of editing real data.

FIG. 24 shows the states of the management information file 3202, the moving picture file 3203 and the still picture file 3204 in the case where the status flag is '5'. It is presumed, by way of example, that the power supply is interrupted in the course of partial deletion of the moving picture file 3203. In the figure, points P3601 to P3602 indicate the portion which were to be deleted. However, it is uncertain whether or not the data of this portion has been deleted correctly. Besides, the result of the deletion is not reflected in the management information file 3202. Consequently, incoincidence or discrepancy occurs between the management information file 3202 and the moving picture file 3203. On the other hand, no incoincidence or discrepancy is taking place between the management information file 3202 and the still picture file 3204. However, this status can not be decided only by checking simply the management information file 3202. Accordingly, the management information file 3202 and the management information backup file 3205 are deleted from the optical disk 3009 in a step S3416 which succeeds to the step S3405. Subsequently, in a step S3417, the moving picture file 3203 is firstly read out from the optical disk 3009 for analyzing sequentially the stream data thoroughly from the leading portion to the end thereof to thereby repair defective portion of the stream data itself while executing concurrently the repair processing by generating newly the management information file 3202. Further, the still picture file 3204 is read out from the optical disk 3009 for analyzing sequentially the stream data thoroughly from the leading portion to the end thereof in a step S3417 to thereby repair defective portion of the stream data itself while executing the repairing operation concurrently by adding the relevant data to the management information file 3202 repaired as mentioned above. Upon completion of the repairing operation, the result of repairing is recorded onto the optical disk 3009 in the step 3420. In that case, all the files inclusive of the management information backup file 3205 are recorded. In this conjunction, it should be added that such arrangement may equally be adopted that the moving picture file 3203 and the still picture file 3204 are recorded appropriately on the optical disk 3009 concurrently with the progress of the repairing operation in the step S3417 instead of recording them in the step S3420. In the step S3421, the status flag held by the status storing memory 3011 is reset to '0' with the recording/reproduction waiting state being set in the step S3408, whereupon the repair processing is terminated in the step S3409.

When the status flag is '6', this means that the power supply is interrupted in the course of carrying out the edition only for the management information file 3202, without being accompanied with the edition of the AV data file. Accordingly, the status will be such that no incoincidence or discrepancy is taking place between the management information backup file 3205 and the moving picture file 3202 or alternatively between the management information backup file 3205 and the still picture file 3203 although it is not clear in what state the management information file 3202 lies. Such being the circumstances, in a step S3418 succeeding to the step S3406, the contents of the management information backup file 3205 on the optical disk 3009 are overwritten in place of the contents of the management information file 3202. Subsequently, in the step S3421, the status flag of the status storing memory 3011 is reset to '0' with the recording/ reproduction waiting state being set in the step S3408, whereon the repair processing comes to an end in the step S3409.

When the status flag is '7', this means that breakage of the power supply has occurred in the course of recording the management information backup file 3205. Thus, in a step S3419 succeeding to the step S3407, the contents of the management information file 3202 on the optical disk 3009 are overwritten in the form of the management information backup file 3205. The processings in the succeeding steps are essentially same as those described previously. Namely, in the step S3421, the status flag held by the status storing memory 3011 is reset to '0' with the recording/reproduction waiting state being set in the step S3408, whereupon the repair processing comes to an end in the step S3409.

As will now be understood from the foregoing description, according to the fifth embodiment of the present invention in which the status storing memory is provided for setting individually and appropriately the status flags indicating the recording, reproduction and the edit operations, respectively, it is possible to repair the management information and the AV data injured due to unexpected power supply breakage by referencing the status flag upon restoration of the power supply. Further, because repairing is performed by analyzing directly the stream data, there is no necessity of containing in advance the data for repairing in the stream data. Furthermore, because the repair processing can be started from the relevant location in the stream data in dependence on the status flags, extraneous time consumption can be avoided.

In conjunction with the instant embodiment of the invention, description has been made that the repairing operation is carried out unconditionally in dependence on the status flags. It should however be appreciated that such arrangement may equally be adopted in which a step is provided for requesting the user's command input after determination of the status flag, wherein the repairing operation is performed in accordance with the user's command as inputted. In that case, however, it will be necessary to make available such a mechanism that a message informing the operator of inadequacy of data on the disk is issued to the operator by displaying the message or by adopting the like messaging facility for coping with such situation in which the command for neglecting the repair is inputted by the user in response to the command request issued by the apparatus.

In the repair processing procedure described in the foregoing, there may arise such a case in which the stream data of the AV data file contains defective portion because of occurrence of power supply breakage in the course of recording operation. In the following, description will be made of an embodiment of the present invention which is directed to repairing method for remedying the defective portion contained in the stream data in the repair processing procedure described above, by illustrating exemplary contents thereof.

Figure 25:
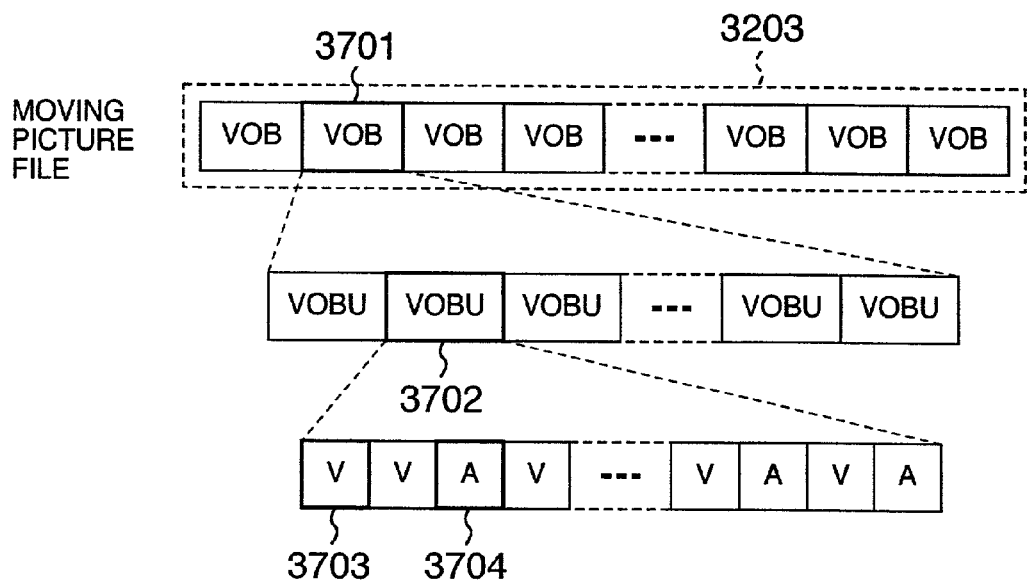
FIG. 25 is a diagram showing a data structure of a moving picture file for management.

At first, a recording format of the AV data file will be elucidated by reference to FIG. 25.

FIG. 25 is a schematic view for illustrating, by way of example, a data structure in general of the moving picture file 3203 managed internally of the management information file 3202. The moving picture file 3203 is constituted by a series of units or objects for processing, as designated by reference numeral 3701. They are termed video object or VOB in short. At this juncture, it should however be mentioned that although one VOB is ordinarily handled as one record unit generated through a single recording operation, the invention is never restricted thereto. One VOB 3701 is constituted in such a form that a plurality of units called VOB Unit or VOBU in short and designated by numeral 3702 are arrayed in succession. The VOBU 3702 represents a constituent unit required for performing the special reproduction such as fast-feed reproduction, the fast-rewind reproduction and the like and serves as a predetermined encode unit on the basis of which the encoding is performed. As described hereinbefore, the international standards "MPEG2 Video Specification (ISO/IEC13818-2)" is generally adopted as the encoding scheme for the picture data, according to which the VOBU 3702 is implemented in such a structure which contains one or more sheets of I-picture(s) which is specified as the in-plane encoded picture in the standards mentioned above. Further, the VOBU 3702 is implemented in such a structure in which appropriate numbers of video packs (indicated by affixing "V") designated by numeral 3703, audio packs (indicated by affixing "A") designated by numeral 3704, etc., respectively, are multiplexed in the form being synchronized with each other. Parenthetically, it should be added that although the VOBU 3702 may contain other pack(s) in addition to the two species mentioned above, the following description of the embodiment of the invention will be made on the presumption that the VOBU 3702 is composed of the packs of two species mentioned above because the pack of any other species does not play any essential role. On the other hand, as the encoding scheme for the audio data, the MPEG2 audio specifications (ISO/IEC13818-3) may be adopted as in the case of the picture data. However, the MPEG1 audio specifications (ISO/ICE11172-3) or the linear PCM sound system may equally be adopted or employed. Accordingly, the present invention is not restricted to any particular audio data encoding scheme, being understood, however, that the MPEG2 standards (ISO/IECI13818-1) are generally adopted as the multiplexing schemes for the video packs 3703 and the audio packs 3704.

Figure 26:
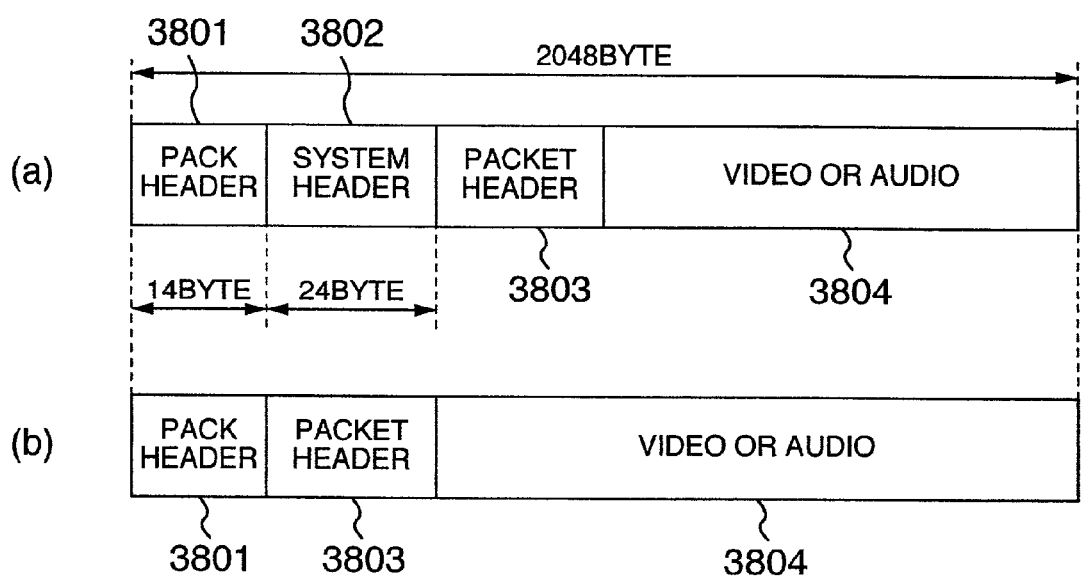
FIG. 26 is a diagram showing a pack structure of stream data.

FIG. 26 is a view showing structures of the video pack 3703 and the audio pack 3704. More specifically, shown in FIG. 26 at (a) is a structure of the pack disposed in the VOBU 3702 at the leading position, while shown in FIG. 26 at (b) is a structure of the pack disposed at a position other than the leading position in the VOBU 3702. One pack has a fixed length of 2408 bytes. More specifically, the leading pack of the VOBU 3702 is comprised of a pack header 3801 of 14 bytes, a system header 3802 of 24 bytes, a packet header 3803 succeeding thereto and additionally real data 3804 concerning the picture or sound, as illustrated in FIG. 26 at (a). The packet header 3803 and the real data 3804 have variable lengths in dependence on the contents of the data. Thus, it can discriminatively be determined by checking the contents of the packet header 3803 whether the relevant pack is a video pack or an audio pack. On the other hand, as can be seen in FIG. 26 at (b), such a structure is adopted for the packs other than the leading pack of the VOBU 3702 in which the system header 3802 is absent, when compared with the leading pack of the VOBU 3702 described above. At this juncture, it should be added that the units subjected to the processing such as VOB and VOBU are used only for performing the data management in the management information file 3202. Accordingly, considering the moving picture file 3203 and the still picture file 3204 simply as the data, these VOBs and VOBUs are recognized as series of stream data which are multiplexed in accordance with the MPEG2 system standards described previously. Parenthetically, details of the multiplexing scheme itself are disclosed in the written MPEG2 system standards mentioned previously. Thus, description thereof in detail will be unnecessary.

Figure 27:
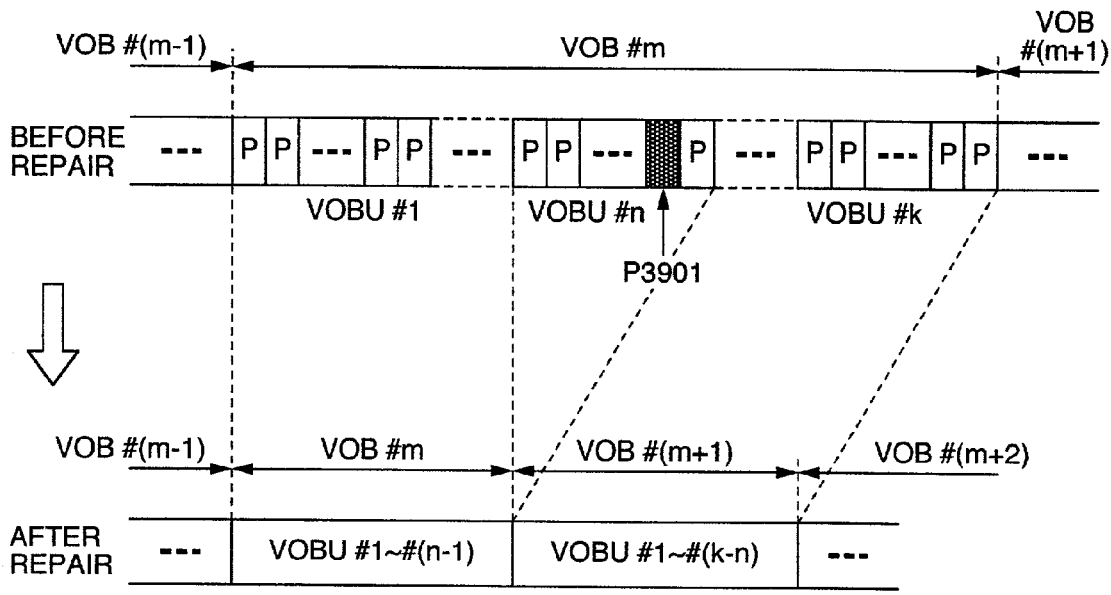
FIG. 27 is a view for illustrating an information recording/reproducing method according to a sixth embodiment of the present invention.

FIG. 27 is a view illustrating a sixth embodiment of the present invention, which shows, by way of example, a method according to which the management information file 3202 and the moving picture file 3203 themselves are repaired by analyzing the moving picture file 3203 read out from the optical disk 3009 in the repairing operation described previously. Parenthetically, "P" shown in the figure represents a video pack or an audio pack, and m, n and k represent positive integers, respectively. As described hereinbefore in conjunction with the fifth embodiment of the invention, in the case where the analysis is performed from the leading position of the stream data with the status flag being '5' upon stating of the repairing operation or in the case where the analysis is performed from an intermediate position of the stream data (point P3501 shown in FIG. 23) with the status flag being '1' or '2', the starting position is a pack delimiting position. It is assumed, by way of example, that the stream data analysis for repairing the m-th VOB (represented by VOB#m, same in the description which follows) in FIG. 27. In that case, so far as all the succeeding stream data are normal, delimitation of the VOBU can be determined by detecting the pack header 3801 mentioned above and then detecting the system header 3802. Thus, information concerning the number of packs constituting the VOB and VOBU as well as the time information of each VOBU can be acquired. Furthermore, by analyzing a part of the leading portion of the packet header 3803 and a part of a leading portion of the real data 3804, the information concerning the number of packs constituting the I-picture internally of the VOBU as well as the time information for decoding can be acquired. Thus, the information concerning the stream data which succeed to the VOB#m can be reflected in the management information file 3202. In that case, the analysis may be performed successively on a pack-by-pack basis. Thus, there arises no necessity of analyzing all of the real data 3804.

At this juncture, it is presumed that the VOB#m shown in FIG. 27 is composed of k VOBUs and that at the point P3901 of the n-th VOBU (represented by VOBU#n, same in the description which follows), a defect of the stream data such as dropout of the pack header and the system header or improperness of the time information for decoding is detected. Since generation of the management information file 3202 with the defective portion being left as it is will incur the possibility that the reproduction output display contains defectiveness, needless to say. For this reason, the VOBU in which the point P3901 is contained is deleted from the stream data. In that case, when the VOBU of concern is located at an intermediate position of the VOB, the time information for each VOBU becomes discontinuous due to the delete processing. Accordingly, the management information file 3202 is so processed that the VOB is delimited at the position mentioned above. As a result of this, the VOB#m is composed of (n−1) VOBUs, while VOB# (m+1) is composed of (k−1) VOBUs. In succession, the repairing operation is continued up to the trailing end of the stream data, wherein the delete processing similar to that described above is carried out upon every detection of defective portions.

As is apparent from the above, according to the sixth embodiment of the present invention, analysis of the stream data is performed on a per-pack basis in the repair processing, wherein upon detection of defect of data, the data delete processing is performed on a per-VOBU basis and reflected in the management information. By virtue of this feature, it is possible to correct or cancel out discrepancy or incoincidence between the management information file and the AV data file.

Figure 28:
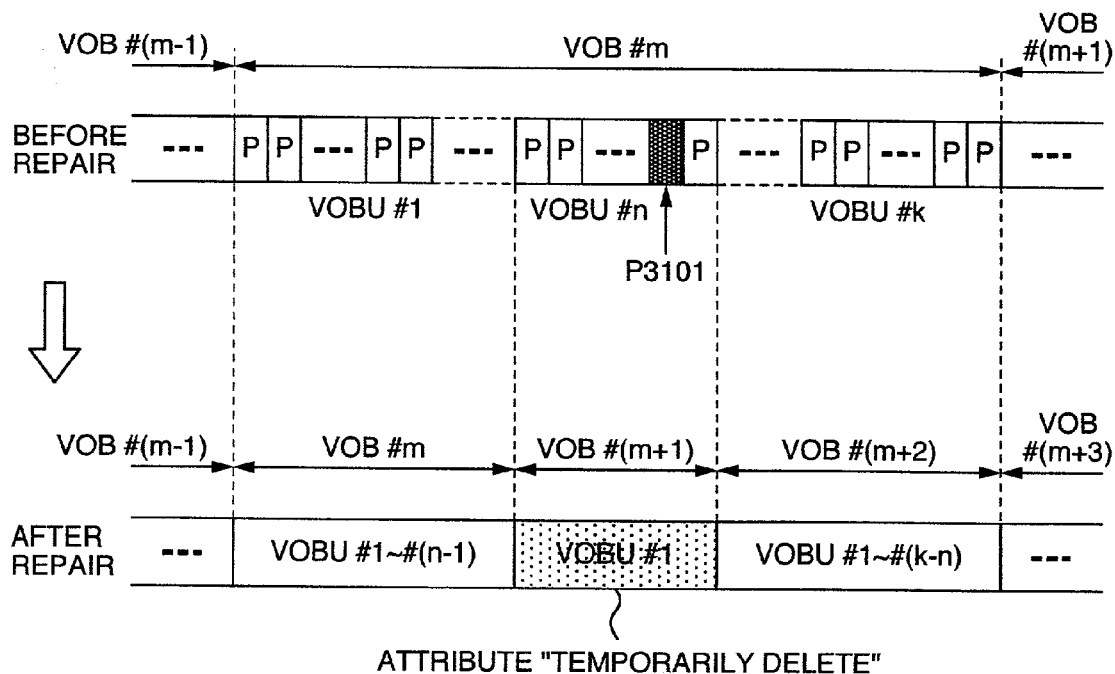
FIG. 28 is a view for illustrating an information recording/reproducing method according to a seventh embodiment of the present invention.

FIG. 28 is a view illustrating a seventh embodiment of the present invention and shows an example of repairing of the management information file 3202 and the moving picture file 3203 themselves by analyzing the moving picture file 3203 read out from the optical disk 3009 as in the case of the example described above by reference to FIG. 27. Similarly to the case illustrated in FIG. 27, it is supposed that the VOB#m is composed of k VOBUs and that at the point P3101 of the VOBU#n, a defect of the stream data such as dropout of the pack header and/or the system header or improperness of the time information to be decoded is detected.

Since generation of the management information file 3202 with the defective portion being contained as it is will incur a possibility that the reproduction output display may contain defectiveness, as described previously in conjunction with the sixth embodiment. However, according to the invention incarnated in the instant embodiment, the VOBU in which the point P3901 is contained is not deleted from the stream data but handled as the independent VOB in the ordinary manner internally of the management information. More specifically, the attribute of the concerned VOB is set as "A1" internally of the management information. Further, for the item decided as defective, as mentioned above, a value which can be accommodated by the Standards is recorded as a dummy. By way of example, in the case where the time information is reversed between the leading portion and the trailing end portion of the VOB, the time information is corrected to appropriate values internally of the management information so that the reversal mentioned above makes disappearance.

When the VOBU of concern is located at an intermediate position of the VOB, the VOBU is managed independently as a VOB. Accordingly, the management information file 3202 is so processed that the VOB is delimited before and after the position mentioned above. As a result of this, the VOB#m is composed of one VOBU, while VOB# (m+2) is composed of (k−n) VOBUs. In succession, the repairing operation is carried out continuously up to the trailing end of the stream data, and the processing similar to that described above is executed upon every detection of a defective portion.

When the repairing operation of the moving picture file 3203 is performed on the basis of the management information file 3202 updated through the repair processing described above, the VOB# (n+1) is not reproduced since it is set with the attribute "temporarily deleted". However, since the operator can recognize existence of data of the attribute "temporarily deleted" through the medium of the output unit 3010 and the user interface (I/F) 3003 shown in FIG. 19, it is possible to delete the relevant data portion afterwards. Furthermore, in the case where the contents on the optical disk 3009 in the state mentioned above is handled with a personal computer or PC, it is possible to analyze all the data since any portion of the moving picture file 3203 is not modified at all through the repairing operation.

As is apparent from the above, according to the teaching of the invention incarnated in the seventh embodiment, the stream data is analyzed on a per-pack basis for the repairing purpose, wherein upon detection of a defect in the stream data, the relevant VOBU in the management information is handled as the VOB to be managed as the attribute "temporarily deleted" for correcting the discrepancy or incoincidence between the management information file and the AV data file. Thus, the reproduction output can be protected against any improperness.

In the foregoing, description has been made in conjunction with the exemplary embodiments of the present invention on the presumption that eight different values are used as the values for the status flag. However, the present invention is never restricted to any specific number of the status flag values. A greater number of status flag values may be employed for realizing the repair processing more finely. Alternatively, the repair processing may be simplified by using a smaller number of status flag values. Further, in conjunction with the sixth and seventh embodiments of the invention, description has been made on the assumption that repairing of the moving picture file 3203 is performed because of occurrence of the power supply breakage in the course of repairing the moving picture file. It should however be understood that the method described previously in this conjunction can equally be applied to the repair processing for the still picture file 3204 for which the status flag value is '3' or '4' through similar management procedure such as deletion of VOBU containing the defective portion, alteration or change of the attribute thereof or the like. Incidentally, the method of determining the defective location or position in the stream data has not been described in detail. It should however be appreciated that the states to be decided as suffering the defectiveness are not restricted to those described previously but may include such state in which the amount of data as recorded is extremely small, etc. In other words, the level or degree of defectiveness can be altered appropriately as the case may be.

Furthermore, although the foregoing description of the illustrated embodiments has been made on the assumption that the recording apparatus is constituted by a camera. However, this is only by way of example and the present invention is never restricted to the camera. Since the unexpected power supply breakage will take place even in the fixed type information recording/reproducing apparatus operating under power supply tapped from the interior wiring, the present invention can equally be carried out upon restoration of the power supply in such application as mentioned just above.

Additionally, as to the recording medium, optical disk such as DVD disk or the like has been exemplified. However, the present invention is never restricted to the recording on such optical disk but can be carried out equally in the case where the recording medium on which information is recorded on a real time basis such as magnetic DVD disks, semiconductor memories or the like are employed.

Besides, in the foregoing description of the exemplary embodiments of the invention, it has been assumed that the volatile memory is employed as the management information expansion memory on which the management information is developed pr expanded. However, the present invention can also be carried out equally in the case where the nonvolatile memory is employed as well. In that case, reliability of the information record/reproduce processings executed upon occurrence of the unexpected power supply breakage can further be enhanced.

As is apparent from the foregoing, according to the teachings of the present invention, even when the recording operation is suddenly interrupted due to occurrence of breakage of electric power supply, it is possible to generate the bit stream file which contains the information for repairing the management information file and the bit stream file which have been written on the recording medium until the electric power supply is stopped.

Additionally, according to the present invention, even when the recording is stopped due to unexpected occurrence of electric power supply breakage, it is possible to repair the management information file and the bit stream file written on the recording medium until the electric power supply is broken.

In addition, according to the teachings of the present invention, it is possible to decide selectively whether or not repairing operation is to be carried out when electric power supply is restored after interruption of the recording operation due to occurrence of unexpected breakage of the power supply in the course of the recording operation. Besides, even in the case where it is determined that the repairing operation is not to be carried out, the succeeding recording operation can be started. More specifically, when outdoor video recording is being performed by using a camera or the like and when the recording operation is stopped or interrupted due to unexpected shutdown of the power supply, execution of the repairing operation upon restoration of the power supply makes it impossible to carry out immediately the succeeding recording operation on the one and same recording medium because a lot of time is taken for repairing. However, according to the teachings of the present invention, the succeeding recording operation can be instantaneously started upon restoration of the power supply even for the one and same recording medium. Thus, wasteful consumption of time and electric power can be avoided while ensuring significantly improved convenience for the user in using the recording apparatus.

Moreover, according to the present invention, detailed discriminating information concerning the operating states is stored by providing the status storing memory so that the management information file and the AV data file can be repaired by referencing the status discriminating information when the power supply is restored after unexpected breakage thereof. Since repairing is realized by analyzing directly the stream data, there arises no necessity of containing in advance the repairing data in the stream data, but the repairing operation can be started from the concerned location in the stream data in accordance with the status discriminating information mentioned above. Thus, extraneous time and power consumption can be avoided.

Furthermore, according to the present invention, analysis of the stream data is performed on a predetermined unit basis, and upon detection of defectiveness of data, data delete processing is executed on an appropriate per-code basis for the relevant data portion containing the defect, which is then reflected in the management information. Thus, it is possible to correctively cope with discrepancy or incoincidence between the management information file and the AV data file, whereby any adverse influence to the succeeding recording, reproduction and/or editing operation can positively be prevented.

Additionally, according to the present invention, the stream data is analyzed on a predetermined per-unit basis in the repairing operation, wherein when a data defect is detected, the relevant code unit of the management information containing the data defect is handled as an encode unit of a higher level which can be managed independently. Thus, by managing it as the attribute such as the attribute "temporarily deleted" which exerts no influence to the succeeding recording, reproduction and/or the editing operation, discrepancy or incoincidence possibly existing between the management information file and the AV data file can be correctively avoided. Additionally, since it is not required to process especially the stream data, it is possible to reference the whole AV data file on the disk by resorting to other appropriate procedure.

What is claimed is:

1. An information recording/reproducing apparatus characterized in that said apparatus comprises recording data multiplexing means for multiplexing at least encoded video data and encoded audio data, record data storing means for storing data outputted from said recording data multiplexing means, management-information-generation-destined data generating means for generating data required for generating management information for reproducing data recorded on said recording medium on the basis of data obtained from said recording data multiplexing means, management information storing means for storing said management information, management information generating means for generating said management information on the basis of output of said management-information-generation destined data generating means for writing or reading said management information in or from said management information storing means, recording medium drive processing means for recording or reading on or from the recording medium at least information outputted from said recording data storing means or information outputted from said management information generating means, recording status storing means for storing status information indicative of status of recording processing, and consolidative management means for managing said recording data multiplexing means, said recording data storing means, said management-information-generation-destined data generating means, said management information generating means, said management information storing means, said recording medium drive processing means and said recording status storing means, wherein said consolidative management means is arranged to write or read out said status information onto or from said recording status storing means;

further characterized in that said apparatus comprises said recording medium drive processing means for recording or reading out information on or from a recording medium, record data demultiplexing means for demultiplexing the encoded video data and the encoded audio data from the information read out from said recording medium, said management-information-generation-destined data generating means for generating data required for generating management information for reproducing data recorded on said recording medium on the basis of the data obtained from said record data demultiplexing means, said management information storing means for storing said management information, said management information generating means for generating said management information on the basis of output of said management-information-generation-destined data generating means for writing or reading said management information in or from said management information storing means, management information reading means for reading out said management information from information read out from said recording medium for outputting said management information to said management information storing means, and consolidative management means for managing said record data demultiplexing means, said management-information-generation-destined data generating means, said management information generating means, said management information storing means, said recording medium drive processing means, said management information reading means and said recording status storing means, wherein said recording medium drive processing means is designed to record the information outputted from said management information generating means on said recording medium, and wherein said consolidative management means is designed to write or read out said status information onto or from said recording status storing means;

further comprising, an editor apparatus characterized in that the information outputted from said recording data storing means is recorded in the form of a data file on said recording medium with the information outputted from said management information generating means being stored on said recording medium as first and second plural sets of management information files, and that said apparatus comprises file system manage processing means for managing the files so that the file can be written or read out on or from said recording medium in a predetermined file format or a new file can be generated from two files, first management information file read processing means for reading said first set of management information file from said file system manage processing means, first management information storing means for storing said first set of management information read out from said first management information file read processing means as-first management information, management information file write processing means for reading out said first management information from said first management information storing means to thereby write said first management information in said file system manage processing means as said first set of management information file, second management information file read processing means for reading out said second set of management information file from said file system manage processing means, second management information storing means for storing said second set of management information read out from said second management information file read processing means as second management information, combine processing means for generating new management information from the information stored in said first management information storing means and the information stored in said second management information storing means to thereby write said new management information in said first management information storing means, wherein said data file and said plural sets of management information files are combined in one set.

2. In an information recording/reproducing apparatus set forth in claim 1, an editor apparatus characterized in that plural sets of said data file and said management information file recorded on said recording medium include two or more sets of said data file and said management information file and that said two or more sets of said data file and said management information file are combined in one set.

3. An information recording/reproducing apparatus set forth in claim 1, characterized in that a first set of said data file and said management information file recorded on said recording medium are checked on the basis of said status information read out from said recording status storing means to thereby alter an identifier of said first set to a second identifier in the case where the unreproducible information is included in said first set, wherein a new data file and a new management information file to be recorded on said recording medium is recorded on said recording medium as a first set of the new data file and the new management information file.

4. An information recording/reproducing apparatus characterized in that said apparatus comprises recording data multiplexing means for multiplexing at least encoded video data and encoded audio data, record data storing means for storing data outputted from said recording data multiplexing means, management-information-generation-destined data generating means for generating data required for generating management information for reproducing data recorded on said recording medium on the basis of data obtained from said recording data multiplexing means, management information storing means for storing said management information, management information generating means for generating said management information on the basis of output of said management-information-generation destined data generating means for writing or reading said management information in or from said management information storing means, recording medium drive processing means for recording or reading on or from the recording medium at least information outputted from said recording data storing means or information outputted from said management information generating means, recording status storing means for storing status information indicative of status of recording processing, and consolidative management means for managing said recording data multiplexing means, said recording data storing means, said management-information-generation-destined data generating means, said management information generating means, said management information storing means, said recording medium drive processing means and said recording status storing means, wherein said consolidative management means is arranged to write or read out said status information onto or from said recording status storing means;

further characterized in that said recording status storing means is implemented as storing means which holds the stored information even when electric power supply is broken;

further comprising a recording apparatus characterized in that said apparatus comprises moving picture compression-encode processing means for performing compression-encoding of analog moving pictures, sound compression-encode processing means for performing compression-encoding of analog sound, moving picture/sound multiplex processing means for multiplexing compression-encoded moving picture data outputted from said moving picture compression-encode processing means and compression-encoded sound data outputted from said sound compression-encode processing means, management-information-expansion data generate processing means for acquiring information required for management information file generation from said moving picture/sound compression-multiplex processing means to write additionally said information in management information expansion data expanded on said management information expansion memory as management information expansion data, a stream buffer for storing once temporarily a multiplexed stream outputted from said moving picture/sound compression-multiplex processing means, stream buffer managing means for commanding writing of said multiplexed data into said file system managing means from said stream buffer as a multiplexed stream file, a nonvolatile status management memory which is a nonvolatile memory for storing process stage statuses of recording processing, repair processing means for repairing format of said management information file or said multiplexed stream file to restore a normal format thereof when said management information file or said multiplexed stream file is abnormal, and activate processing means designed upon activation thereof to supervise said nonvolatile status management memory, issue a command for expanding said management information file on said management information expansion memory in dependence on status, command said repair processing means to repair the management information file and said multiplexed stream file, command said repair processing means to alter names of the management information file and said multiplexed stream file, and combine plural sets of said picture data files and said management information files into one set.

* * * * *

UNITED STATES PATENT AND TRADEMARK OFFICE
CERTIFICATE OF CORRECTION

PATENT NO.        : 7,340,153 B2                                               Page 1 of 1
APPLICATION NO. : 09/757802
DATED             : March 4, 2008
INVENTOR(S)      : Yukio Isobe et al.

It is certified that error appears in the above-identified patent and that said Letters Patent is hereby corrected as shown below:

On title page, left-hand column:

Item "(22)  Filed:  Jul. 30, 2001" should read  --(22)  Filed:  Jan. 9, 2001--

Signed and Sealed this

Seventeenth Day of June, 2008

JON W. DUDAS
*Director of the United States Patent and Trademark Office*